(12) United States Patent
Hiltunen et al.

(10) Patent No.: US 10,559,229 B2
(45) Date of Patent: Feb. 11, 2020

(54) SECURE MULTI-PARTY DEVICE PAIRING USING SENSOR DATA

(71) Applicant: AT&T Intellectual Property I, L.P., Atlanta, GA (US)

(72) Inventors: Matti A. Hiltunen, Morristown, NJ (US); Emiliano Miluzzo, Madison, NJ (US); Abhinav Srivastava, Edison, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/243,310

(22) Filed: Jan. 9, 2019

(65) Prior Publication Data
US 2019/0164455 A1 May 30, 2019

Related U.S. Application Data

(63) Continuation of application No. 15/729,821, filed on Oct. 11, 2017, now Pat. No. 10,217,381, which is a
(Continued)

(51) Int. Cl.
*G09C 1/00* (2006.01)
*H04L 9/08* (2006.01)
*H04W 12/04* (2009.01)

(52) U.S. Cl.
CPC .............. *G09C 1/00* (2013.01); *H04L 9/0877* (2013.01); *H04W 12/04* (2013.01); *H04L 2209/805* (2013.01)

(58) Field of Classification Search
CPC .. G09C 1/00; H04W 12/04; H04W 12/00504; H04W 12/003; H04L 9/0877; H04L 2209/805
See application file for complete search history.

(56) References Cited

U.S. PATENT DOCUMENTS

| | | |
|---|---|---|
| 6,807,181 B1 | 10/2004 | Weschler |
| 8,555,065 B2 | 10/2013 | Cesnik |

(Continued)

FOREIGN PATENT DOCUMENTS

GB 2447674 B 9/2008

OTHER PUBLICATIONS

Cai et al., "Good Neighbor: Ad Hoc Pairing of Nearby Wireless Devices by Multiple Antennas", Computer Science Department, UC Davis, In Network and Distributed System Security Symposium, 2011, pp. 1-20.
(Continued)

*Primary Examiner* — Matthew Smithers
(74) *Attorney, Agent, or Firm* — Amin, Turocy & Watson, LLP

(57) ABSTRACT

Content is securely shared between communication devices in an ad-hoc manner by employing common sensing context to establish pairing between the communication devices. In one aspect, the communication devices are within a specified distance from each other and sense common signals from their environment over a specified time period. The common signals are analyzed to determine an initialization or session key, which is utilized to secure content transfer between the communication devices. Additionally or alternatively, the key is utilized to provide access to virtual (e.g., digital content) and/or physical (e.g., buildings) resources.

20 Claims, 17 Drawing Sheets

Related U.S. Application Data continuation of application No. 13/909,765, filed on Jun. 4, 2013, now Pat. No. 9,818,315.

(56) References Cited

U.S. PATENT DOCUMENTS

| | | | | |
|---|---|---|---|---|
| 8,837,716 | B2* | 9/2014 | Andrus | H04L 9/0844 380/44 |
| 8,868,039 | B2* | 10/2014 | Rodriguez | H04M 1/7253 455/411 |
| 8,897,446 | B2 | 11/2014 | Bichler et al. | |
| 9,818,315 | B2* | 11/2017 | Hiltunen | G09C 1/00 |
| 10,217,381 | B2* | 2/2019 | Hiltunen | G09C 1/00 |
| 2003/0218533 | A1 | 11/2003 | Flick | |
| 2007/0177729 | A1 | 8/2007 | Reznik et al. | |
| 2007/0248232 | A1 | 10/2007 | Driscoll et al. | |
| 2007/0271459 | A1* | 11/2007 | Gomez | H04L 63/0442 713/171 |
| 2008/0046583 | A1 | 2/2008 | Rao | |
| 2008/0069105 | A1 | 3/2008 | Costa et al. | |
| 2009/0167487 | A1 | 7/2009 | Shah et al. | |
| 2010/0278345 | A1* | 11/2010 | Alsina | H04L 63/0492 380/283 |
| 2010/0299522 | A1 | 11/2010 | Khambete | |
| 2011/0126014 | A1* | 5/2011 | Camp, Jr. | H04M 1/7253 713/171 |
| 2011/0258430 | A1 | 10/2011 | Luukkala et al. | |
| 2011/0314168 | A1* | 12/2011 | Bathiche | H04W 4/21 709/228 |
| 2012/0124662 | A1 | 5/2012 | Baca et al. | |
| 2012/0159147 | A1 | 6/2012 | Ando | |
| 2012/0190299 | A1 | 7/2012 | Takatsuka et al. | |
| 2013/0060905 | A1 | 3/2013 | Mickens et al. | |
| 2013/0067232 | A1 | 3/2013 | Cheung et al. | |
| 2013/0272520 | A1* | 10/2013 | Noda | H04L 9/0861 380/44 |
| 2013/0342314 | A1 | 12/2013 | Chen et al. | |
| 2013/0344859 | A1 | 12/2013 | Abramson et al. | |
| 2014/0046664 | A1* | 2/2014 | Sarkar | H04W 12/06 704/246 |
| 2014/0325231 | A1 | 10/2014 | Hook et al. | |
| 2015/0200776 | A1* | 7/2015 | Kao | H04L 9/0844 713/171 |

OTHER PUBLICATIONS

Stephen Sigg. "Fuzzy cryptography for secure ad-hoc pairing of mobile devices", National Institute of Informatics, 2 pages.

Kobsa et al., "Serial Hook-ups: A Comparative Usability Study of Secure Device Pairing Methods", Symposium on Usable Privacy and Security (SOUPS), Jul. 15-17, 2009, Mountain View, CA, 12 pages.

Buhan et al., "Secure Ad-hoc Pairing with Biometrics: SAfE", CTIT Technical Report Series, University of Twente, CTIT, 2007, 7 pages.

Nguyen et al., "Pattern-Based Alignment of Audio Data for Ad Hoc Secure Device Pairing", 2012 16th International Symposium on Wearable Computers (ISWC), Jun. 18-22, 2012, pp. 88-91.

Jack Purcher. "Apple Wins Patents for Camera & NFC Alternative Technologies", Patently Apple: Celebrating Apple's Spirit of Invention, http://www.patentlyapple.com/patently-apple/2012/10/apple-wins-patents-for-camera-nfc-alternative-technologies.html, Oct. 16, 2012, 10 pages.

Sharma et al., "Feature-level Fusion for Object Segmentation using Mutual Information" Augmented Vision Perception in Infrared, Springer, Dec. 2008, pp. 295-319.

Bichler et al., Key Generation Based on Acceleration Data of Shaking Processes UbiComp 2007, LNCS 4717, Springer-Verlag Berlin Heidelberg 200, 2007, pp. 304-317.

Non-Final Office Action received for U.S. Appl. No. 13/909,765, dated Aug. 18, 2014, 30 pages.

Forman et al., "The Creation of Shared Cryptographic Keys through Channel Impulse Response Estimation at 60GHz", [online], Sep. 2010, [retrieved on Dec. 3, 2014]. Retrieved from the Internet:< http://prod.sandia.gov/techlib/accesscontrol.cgi1201 0/1 06662. pdf>, 1 page.

User: Masoudg/Secret Key Generation via Wireless Channel Characterization, Wikiedia [online]. [Retrieved from the Internet: http://en.wikipedia.org/wiki/User:Masoudg/Secret_ Key-Generation Via_ Wi reless Chan nel_ Characterization, 1 page.

Final Office Action received for U.S. Appl. No. 13/909,765, dated Dec. 15, 2014, 47 pages.

Non-Final Office Action received for U.S. Appl. No. 13/909,765, dated Apr. 28, 2015, 37 pages.

Final Office Action received for U.S. Appl. No. 13/909,765, dated Nov. 12, 2015, 52 pages.

Xu etal., "IMDGuard: Securing Implantable Medical Devices with the External Wearable Guardian", IEEE INFOCOM 2011 [online], retrieved from the Internet<URL: http://ieeexplore.ieee.org/stamp/stamp.jsp?tp=&arnumber=5934987>, 9 pages.

Krhovjak, et.al, Generating Random and Pseudorandom Sequences in Mobile Devices, A.U. Schmidt and S. Lian (Eds.): MobiSec 2009, LNICST 17, [online], © ICST Institute for Computer Sciences, Social-Informatics and Telecommunications Engineering 2009, pp. 122-133.

Nanni, Xmodulo, [online]. Retriieved from the internet<URL:http://xmodulo.com/how-to-change-camera-resolution-programmatically-in-android.html>,Feb. 23, 2013, 6 pages.

Non-Final Office Action received for U.S. Appl. No. 13/909,765, dated Jun. 21, 2016, 52 pages.

Final Office Action received for U.S. Appl. No. 13/909,765, dated Dec. 15, 2016, 35 pages.

Non-Final Office Action Received for U.S. Appl. No. 15/729,821, dated May 31, 2018, 75 pages.

* cited by examiner

SECURE MULTI-PARTY DEVICE PAIRING USING SENSOR DATA

RELATED APPLICATION

The subject application is a continuation of, and claims priority to each of, U.S. patent application Ser. No. 15/729,821, filed Oct. 11, 2017, and entitled "SECURE MULTI-PARTY DEVICE PAIRING USING SENSOR DATA," which is a continuation of U.S. patent application Ser. No. 13/909,765 (U.S. Pat. No. 9,818,315), filed Jun. 4, 2013, and entitled "SECURE MULTI-PARTY DEVICE PAIRING USING SENSOR DATA," the entireties of which applications are hereby incorporated by reference herein.

TECHNICAL FIELD

The subject disclosure relates to wireless communications and, more particularly, to secure multi-party device paring using sensor data.

BACKGROUND

Communication devices are seeing an explosive growth in content sharing via ad-hoc wireless networks. Conventional systems request users to perform multiple manual steps prior to setting up a secure connection (e.g., Bluetooth® connection) between two or more device to share the content. For example, the steps can include forming a group, approving participants, entering passwords or pins on each device, etc. Once a secure connection has been established, content can be shared between two previously unassociated devices in an ad-hoc manner, for example, people at a meeting can share documents, people sharing a meal can share pictures, people at a concert or sporting event can share media files, etc. Other conventional systems utilize Near Field Communication (NFC) to transfer content from one NFC-enabled device to another NFC-enabled device. NFC is a short-range radio technology that enables communication between the NFC-enabled devices when they are very close to each other (e.g., within a distance of 1.5 cm). Most often, the two NFC-enabled devices physically touch each other ("tap") to exchange of small amounts of content within the duration of the tap.

DETAILED DESCRIPTION

Figure 1A:
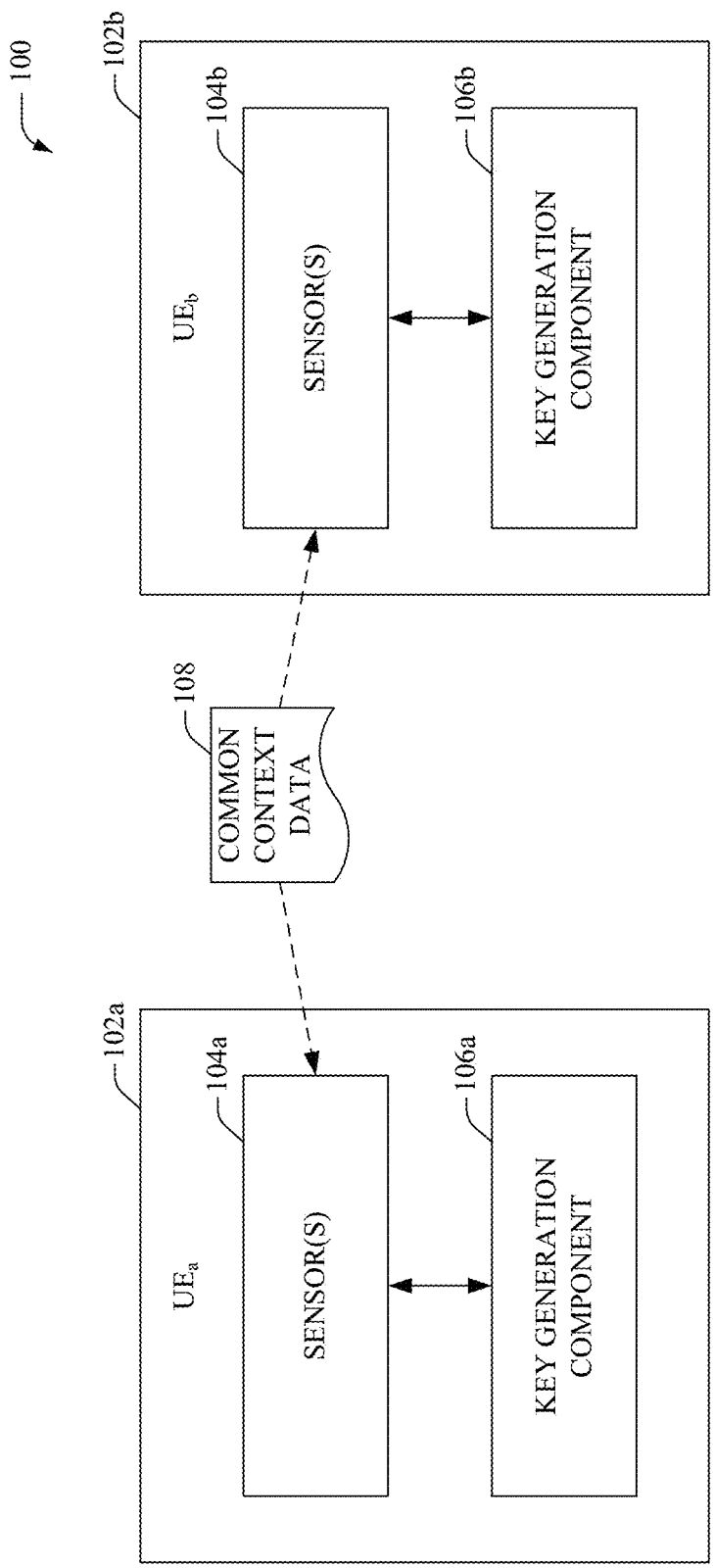
FIGS. 1A-1B illustrate example systems that facilitates multi-device paring based on common context data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," "platform," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies.

Furthermore, the terms "user," "subscriber," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein facilitate content sharing between devices in an ad-hoc manner based on common sensing context to establish pairing between devices. In one aspect, parameters associated with the common sensing context can be synchronized between the devices. For example, the parameters can define when to start the sensing, when to stop the sensing, how to collect the context data, which sensors to user, which features to extract from the sensed data, etc. The devices can utilize the sensed context data to generate a key that can be employed to securely transfer data between the devices and/or to authorize the devices to access a device, data storage, and/or physical location.

Referring initially to FIG. 1A, there illustrated is an example system 100 that facilitates multi-device paring based on common context data, according to one or more aspects of the disclosed subject matter. System 100 can facilitate key generation based on common context data and utilize the key to secure communications between the devices. User equipment (UE) (102a, 102b) can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UEs (102a, 102b) can also include, LTE-based devices, such as, but not limited to, most any home or commercial appliance that includes an LTE radio. It can be noted that UEs (102a, 102b) can be mobile, have limited mobility and/or be stationary.

In one embodiment, UEs (102a, 102b) can be located close to each other (e.g., within a predefined distance) such that they can simultaneously (and/or almost simultaneously) sense context data 108 from their common surroundings via sensors (104a, 104b). Moreover, the sensors (104a, 104b) can include an accelerometer, a gyroscope, a camera, a microphone, a light sensor, a humidity sensor, a temperature sensor, a location sensor (e.g., Global positioning system), and the like. The common context data 108 can include, but is not limited to, a continuous signal (e.g., that can change over time) that can be sensed for a predefined and/or dynamically defined period of time. For example, the continuous signal can be an audio signal, a video signal, a common motion experienced by both UEs (102a, 102b), a sequence of vibrations, etc. Additionally or alternatively, the sensors (104a, 104b) can measure static content data, such as, but not limited to, an image captured by a camera.

According to an aspect, the UEs (102a, 102b) include key generation component (106a, 106b) that analyze data collected by one or more sensors to determine a session key that can be utilized to encrypt/decrypt communication data transmitted between the UEs (102a, 102b). Since both the sensors (104a, 104b) sense the same (or substantially the same) common context data 108, the key generated by the respective key generation components (106a, 106b) can be identical. In one example, the key generation components (106a, 106b) can employ one or more techniques to compensate for variations in common context data 108 measured by the sensors (104a, 104b), for example, due to hardware capabilities and/or restrictions of the sensors (104a, 104b), a variation in a distance of the UEs (102a, 102b) from a signal source, etc. For example, if the UE 102a is placed at a location that is slightly further from a signal source, than the location at which UE 102b is placed, the sensor 104a can receive the signal from the signal source after the signal is received at sensor 104b. However, the key generation components (106a, 106b) can analyze the data collected by the respective sensors (104a, 104b) to extract features that are independent of these variations, such as, but not limited to, determining a pattern or sequence in the signal. In another example, due to different sensitivity (e.g., different sensor implementations, protective cases, etc.), the signal amplitude as observed by the UEs (102a, 102b) can vary. As noted above, to compensate for such variations, the key generation components (106a, 106b) can employ patterns/sequences observed in the received signal data to generate the session key. In one aspect, the signal data collected by the respective sensors (104a, 104b) can also be filtered and/or smoothed, prior to generation of the session key (e.g., based on machine learning analysis).

Typically, a multi-sensing modality approach for session key derivation is much more robust than any single technique in isolation since it provides a more robust confidence about the commonality of the context. According to one aspect, location data (e.g., current location and/or area within which the devices to be paired are located) and/or timestamp data (e.g., current time and/or time period during which the sensors collect the common context data) can also be utilized to improve confidence about the commonality of the context.

Figure 1B:
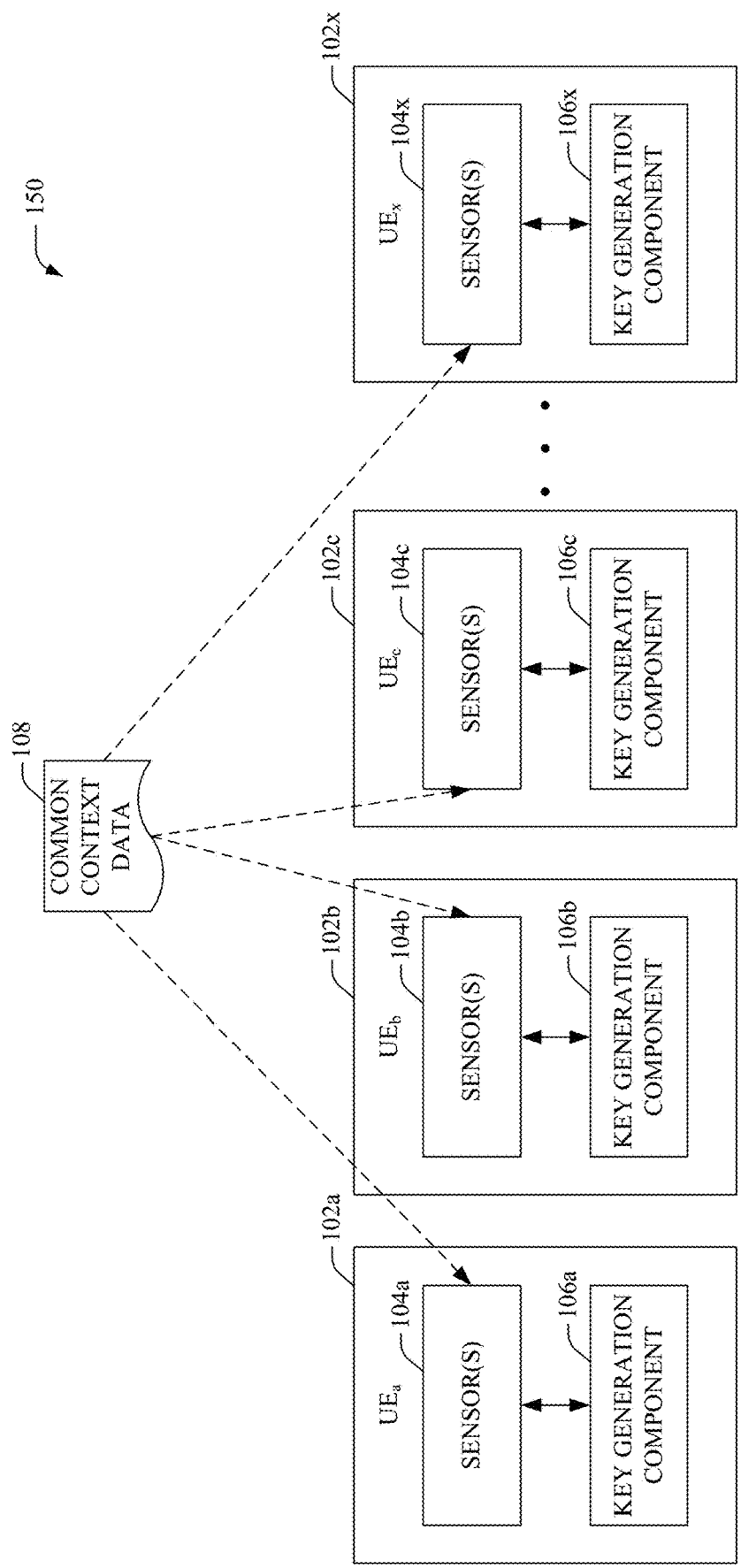

FIG. 1B illustrates a system 150 that depicts a group-wise pairing of more than two UEs based on the common context data 108. In one aspect, system 150 can be utilized to pair most any number of UEs (102a-102x; wherein "x" can be an integer greater than (or equal to) 2). In this example scenario, the group-wise pairing is facilitated in parallel. For example, the UEs (102a-102x) can simultaneously (or almost simultaneously) sense (e.g., via respective sensors 104a-104x) the common context data to facilitate a generation of identical/matching cryptographic keys (e.g., via respective key generation components 106a-106x). In general, the group-wise pairing based on the group of devices simultaneously (or almost simultaneously) sensing common context data 108 to generate cryptographic keys in parallel, is faster and less tedious than performing sequential pairwise pairings (between two devices at a time). In addition, repeating and/or replicating identical signals (at different times), for example, vibrations, live (non-recorded) audio/video streams, or non-recorded image data, temperature signals, humidity signals, etc. found in an environment surrounding the group of devices and/or most any signals that would change over time is extremely challenging; thus, making it almost impossible to obtain identical keys if sequential pair-wise pairing is established between two devices at a time. For example, during sequential pair-wise pairings for a group of more than two devices, Device#1 and Device#2 would be paired at a first time, then Device#1 and Device#3 would be paired at a second time, after which Device#1 and Device#4 would be paired at a third time, and so on and so forth. Since the common context data typically changes with time, obtaining identical keys at the different devices during sequential pair-wise paring is challenging. In contrast, system 150 employs a faster and easier group pairing technique that enables multiple devices (e.g., UEs (102a-102x)) to sense common context data 108 concurrently (or almost concurrently) and generate identical session keys in parallel. For example, the UEs (102a-102x) can be placed on a common surface (e.g., a table) and the common context data 108 can comprise a sequence of knocks applied to the table. In this example scenario, sensors (104a-104x) can simultaneously (or substantially simultaneously) sense vibrations due to the knocks to determine a unique pattern/sequence that can be employed by the key generation components (106a-106x) to determine matching/identical keys for pairing the UEs (102a-102x). The keys can be utilized to facilitate secure communications between the UEs (102a-102x).

Figure 2:
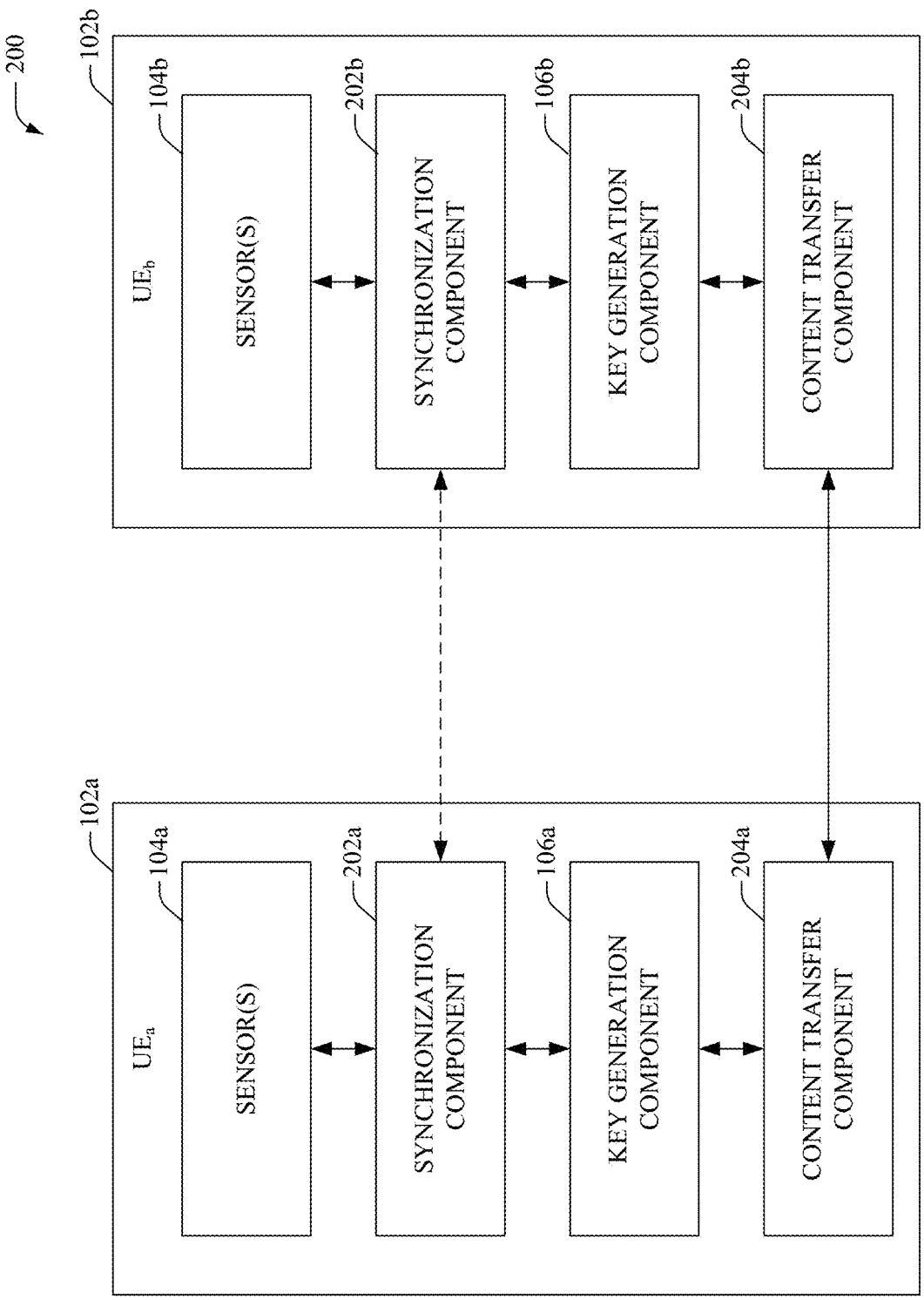
FIG. 2 illustrates an example system that facilitates a secure communication between two (or more) user equipment.

Referring now to FIG. 2, there illustrated is an example system 200 that facilitates a secure communication between two (or more) UEs, in accordance with an aspect of the subject disclosure. In one aspect, system 200 facilitates secure pairing of UEs (102a, 102b) based on the UEs (102a, 102b) sensing one or more common signals from their environment and utilizing the common signal to determine an initialization or session key. Subsequent to the pairing, the UEs (102a, 102b) can share content in a secure manner (e.g., impede an unauthorized device from accessing/decrypting the shared content). For example, the UEs (102a, 102b) can share documents, photos, media files, etc. stored in a local or remotely accessible memory (not shown). The term "pairing" as used herein refers to establishing a secure coupling/connection between two or more devices by generating a common secret such as (but not limited to) a cryptographic key. If identical keys are generated and/or stored by the devices, they are considered to be paired or bonded. It is noted that the UEs (102a, 102b), sensors (104a, 104b), and key generation components (106a, 106b) can include functionality as more fully described herein, for example, as described above with regard to systems 100 and 150. Further, it is noted that although only two UEs (102a, 102b) are depicted in FIG. 2, most any number of UEs can be utilized by system 200 to facilitate group-wise pairing (as described above with respect to system 150).

In one embodiment, during the pairing, sensors (104a, 104b) collect signal data (e.g., for a predefined and/or dynamically determined time period, sample periodically, etc.) from a common environment surrounding both the UEs (102a, 102b). According to an aspect, the synchronization components (202a, 202b) ensure that the signal data collected by the sensors (104a, 104b) is identical or approximately the same. For continuous signals, a time period for which the signal data is to be collected can be specified by the respective synchronization components (202a, 202b). In one example, the synchronization components (202a, 202b) can determine data collection parameters, such as (but not limited to) a time period (e.g., predefined and/or dynamically determined time period), a sampling frequency, information defining a set of the sensors (104a, 104b), which are to be utilized to measure the signal data, a time at which the measurement is to be started/stopped, etc. In another example, the synchronization component 202a can simply broadcast a signal that instructs sensors 104b of UE 102b to start/stop sensing signal data (and/or vice versa).

In one example, the data collection parameters can be manually entered by a user of the UE (e.g., UE 102a) that initiates the pairing/content transfer. In another example, the data collection parameters can be predefined by a manufacturer(s) of the UEs (102a, 102b) and/or a service provider (e.g., mobility network operator). Additionally or optionally, the UEs (102a, 102b) can exchange data collection parameters prior to the content transfer, for example, via a communication network, such as, a WiFi network, a cellular network, a ZigBee network, and the like. For example, if determined that content is to be transferred from UE 102a to UE 102b, the synchronization component 202a can provide data collection parameters to the synchronization component 202b (and vice versa). According to an aspect, the synchronization components (202a, 202b) can perform a dynamic negotiation process, wherein a least common capability/sensing modality of the devices to be paired (e.g., UE 102a, 102b) can be determined and utilized for content sensing and/or key generation.

The key generation components (106a, 106b) can analyze the signal data and determine a session key using at least a portion of the signal data. Since the signal data collected by the sensors (104a, 104b) is the same (or almost the same), the key generation components (106a, 106b) can generate identical/matching keys. In one example, features/properties of the signal data can be extracted and employed to generate the session key. Additionally or optionally, prior to, or concurrent with, the transfer of content, the UEs (102a, 102b) can employ most any key synchronization technique to verify and/or ensure that the key generation components (106a, 106b) have generated the same session key.

In one aspect, content transfer components (204a, 204b) can utilize the key to encrypt/decrypt content (e.g., multimedia files, documents, etc.) exchanged between the UEs (102a, 102b). For example, content transfer component 204a can encrypt content that is to be transferred from UE 102a to UE 102b, for example, by employing most any encryption algorithm (e.g., hash functions, Rivest-Shamir-Adleman (RSA) algorithm, advanced encryption standard (AES), etc.). Further, the content transfer component 204a can transmit and/or broadcast the encrypted data via a public (or private) communication network (e.g., WiFi, cellular network, Zigbee, Near Field Communication (NFC), etc.) In this example scenario, the content transfer component 204b can receive the encrypted content and can utilize the session key generated by the key generation component 106b to decrypt the encrypted content, for example, by employing a decryption algorithm corresponding to the encryption algorithm utilized by the content transfer component 204a.

Figure 3:
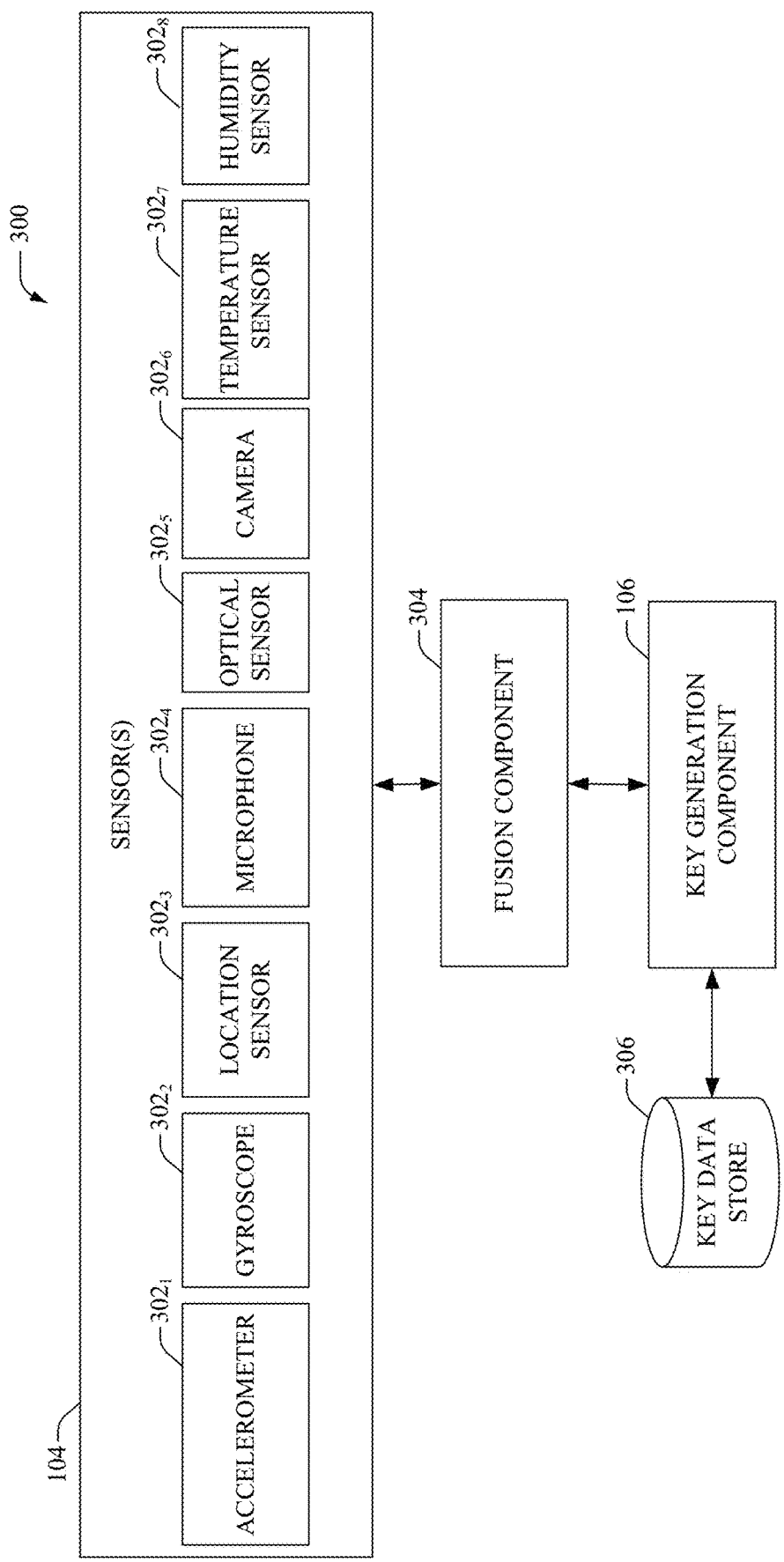
FIG. 3 illustrates an example system that facilitates session key generation for pairing a set of user equipment.

Referring now to FIG. 3, there illustrated is an example system 300 that facilitates session key generation for pairing a set of UEs, according to an aspect of the subject disclosure. Typically, system 300 can be implemented by a UE, for example, UE 102a and/or UE 102b. It is noted that the sensor(s) 104 can be substantially similar to sensor(s) 104a and/or sensor(s) 104b and can include functionality as more fully described herein, for example, as described above with regard to sensor(s) 104a and/or 104b. Further, the key generation component 106 can be substantially similar to key generation component 106a and/or key generation component 106b and can include functionality as more fully described herein, for example, as described above with regard to the key generation components 106a and/or 106b.

In one aspect, sensor(s) 104 can include (but are not limited to) an accelerometer $302_1$ (e.g., to measure vibration signals, and/or speed, direction, acceleration, and/or velocity of the UE), a gyroscope $302_2$ (e.g., to measure vibration signals and/or orientation of the UE), a location sensor $302_3$ (e.g., a GPS system to determine a geographical location of the UE), a microphone $302_4$ (e.g., to measure audio signals), an optical sensor $302_5$ (e.g., to measure ambient light), a camera $302_6$ (e.g., to record images or a video signals), a temperature sensor $302_7$ (e.g., to measure ambient temperature), and/or a humidity sensor $302_8$ (e.g., to measure ambient humidity). It can be appreciated that most any sensor and/or combination of sensors(s) can be employed to measure context data common to the UEs that are to be paired.

As discussed supra, the sensors(s) 104 can be controlled based on instructions received from a synchronization component (e.g., 202a, 202b). For example, sensors(s) 104 can start and/or stop sensing signal data based on predefined times and/or dynamically in response to detection of an event (e.g., sensing a predefined start/stop sequence). According to an aspect, a fusion component 304 can combine the signal data collected by the sensor(s) 104 to generate a seed (e.g., a sequence of bits). As an example, the fusion component 304 can comprise a sequence generator that employs most any concatenation and/or aggregation technique to generate a sequence of bits. Moreover, when multiple sensors are utilized, the fusion component 304 can aggregate and/or combine sequences determined from respective signals sensed by the multiple sensors to generate the seed. For example, the fusion component 304 can employ a logical function, such as, but not limited to, an exclusive OR (XOR) function, and/or more complex fusion algorithms to combine sequences determined from different sensor inputs.

In one aspect, the fusion component 304 can extract key properties from the signal data to facilitate generation of the seed. For example, in case of an audio signal recorded by microphone $302_4$, the fusion component 304 can determine a sequence based on an absence or presence of speech and determine the seed based on the sequence. As another example, in case an image is captured by cameras $302_6$, the fusion component 304 can determine the seed based on basic and/or inherent properties of the image such as (but not limited to) a size, an aspect ratio, number of colors used, pixel color distribution across the image, etc., and/or based on derived properties, which are invariant with respect to picture rotation, lighting, transformation etc. and can be determined (e.g., by the fusion component 304) based on Eigenvalue-based features, Scale-invariant feature transform (SIFT) descriptors, Harris descriptors, Multi-scale Oriented Patches (MOPS) descriptors, and the like. According to an aspect, the fusion component 304 can recognize features within an image and/or classify an image based on most any computer vision technique/algorithm and determine a sequence based on the features and/or classification data.

In general, the generation of the seed based on extracted properties from the signal data can also remedy the discrepancies/variations observed in signal data collected by different sensors of different UEs. As an example, the discrepancies/variations can be introduced due to differences in hardware capabilities (e.g., differing camera resolutions) and/or differences in position/location (e.g., distance of a sensor from a signal source). In one aspect, the fusion component 304 can select features that are to be extracted from the signal data based on a least common sensing modality supported by all the devices that are being paired. For example, the lowest camera resolution supported by all the devices can be considered during extraction of features from a video signal. Accordingly, if one of the devices has a very low camera resolution, the fusion component 304 can determine a sequence based on changes in brightness (e.g., bright vs. dark) rather than details within the image that would not be accurately captured by the low-resolution camera.

In an aspect, the key generation component 106 can employ the seed to generate a cryptographic key (e.g., a session key and/or an initialization key) that is employed to facilitate secure content transfer and/or authorize access to restricted locations (e.g., virtual and/or physical locations). As an example, the cryptographic key can include most any opaque and/or unique (for a specific time and/or session), number or code that can be valid for a time period that is predefined (e.g., by a user, service provider, device manufacturer, etc.) and/or dynamically defined based on an event/criterion, such as (but not limited to) expiration of a timer, termination of a data session, etc. In one aspect, the key generation component 106 can generate the cryptographic key by employing most any number generator that can create the cryptographic key based on the seed determined by the fusion component 304. For example, the key generation component 106 can utilize an MD5 hash of the seed to facilitate key generation. In another aspect, the seed itself can be utilized as the cryptographic key.

In one example, the cryptographic key can be symmetric (e.g., the same key can be utilized for both encryption and decryption of content). In another example, the cryptographic key can be utilized as a private key and utilized in combination with a public key. Typically, in this example scenario, the cryptographic key can be transmitted (e.g., by the content transfer component 204a, 204b) along with each message and can be encrypted with the recipient's public key. According to an aspect, the key generation component 106 can store (e.g., temporarily or permanently) the cryptographic key within key data store 306. As an example, the key can be stored in the key data store 306 for the time that the key is valid (e.g., during a session, for a predefined time, and/or until a timer expires or a data session is terminated, until the user explicitly instructs the UE to delete the key, etc.).

Further, it is noted that the key data store 306 can include volatile memory(s) or nonvolatile memory(s), or can include both volatile and nonvolatile memory(s). Examples of suitable types of volatile and non-volatile memory are described below with reference to FIG. 15. The memory (e.g., data stores, databases) of the subject systems and methods is intended to comprise, without being limited to, these and any other suitable types of memory.

Figure 4:
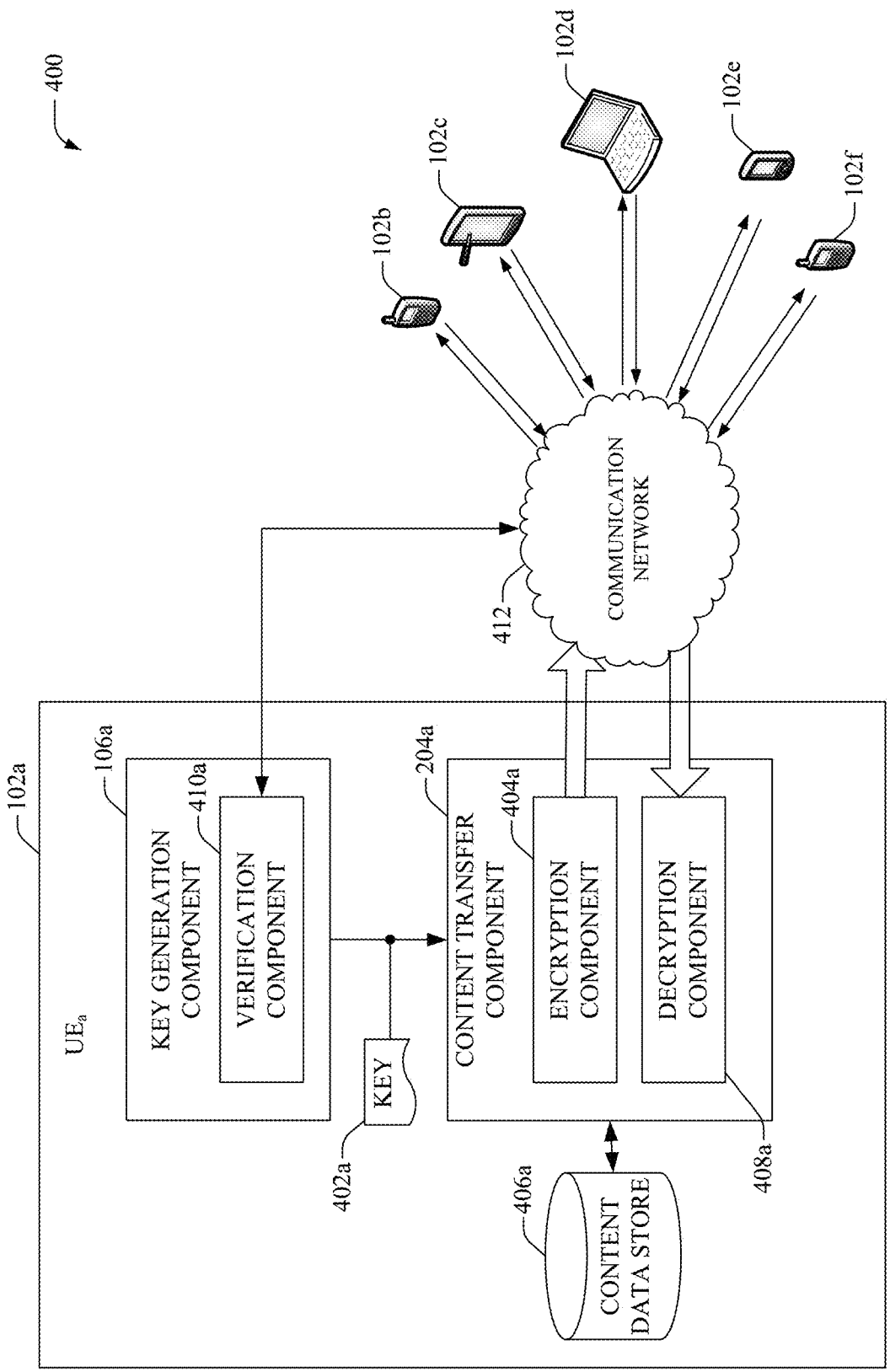
FIG. 4 illustrates an example system that facilitates secure content transfer among a group of devices.

FIG. 4 illustrates an example system 400 that facilitates secure content transfer among a group of devices according to an aspect of the disclosed subject matter. Typically, system 400 can facilitate group-wise pairing of the devices (102a-102f) based on context data that can be simultaneously (or almost simultaneously) sensed by the devices. The UE 102a, UE 102b, and the content transfer component 204a can include functionality as more fully described herein, for example, as described above with regard to systems 100-300. Further, the UEs 102c-102f can be substantially similar to UEs 102a and/or 102b and can include functionality as more fully described herein, for example, as described above with regard to the UEs 102a and/or 102b. Although FIG. 4 illustrates a group of six UEs (102a-102f), the subject system is not that limited and most any number (e.g., two or more) of UEs can be included within the group. As discussed above, since all the UEs (102a-102f) sense common context data, respective key generation components (e.g., 106a, 106b) of the UEs (102a-102f) can generate (e.g., in parallel) identical cryptographic keys (e.g., 402a).

In one aspect, the content transfer component 204a can employ the key 402a to secure communication among the UEs (102a-102f). Moreover, the content transfer component 204a can include an encryption component 404a that can employ most any encryption algorithm (e.g., hash functions, RSA algorithm, AES, etc.) to encrypt content (e.g., documents, files, photos, videos, music, etc.) received from the content data store 406a using the key 402a. In one example, the content transfer component 204a can broadcast the encrypted content via a communication network 412 (e.g., WiFi, cellular, ZigBee, NFC, etc.) and only the paired UEs (102b-102f) will be able to decrypt the content. Other devices (not shown) that can be coupled to the communication network 412 but have not been paired with UEs (102a-102f) may be able to access the broadcasted content but will not be able to decrypt the content. Accordingly, content transfer can be restricted to authorized devices, for example, UEs (102b-102f) that have been paired.

In another aspect, content broadcasted by one or more of the UEs (102b-102f) can be received by the content transfer component 204a and decrypted using the decryption component 408a. As an example, to facilitate decryption of the broadcasted content, the decryption component 408a can utilize a decryption algorithm corresponding to the encryption algorithm employed by the one or more of the UEs (102b-102f). The key 402a (or another key derived from key 402a) can be employed by the decryption algorithm. In one example, the key 402a can be symmetric (e.g., the same key can be utilized for both encryption and decryption of content). In another example, the key 402a can be utilized as a private key and utilized in combination with a public key associated with a recipient and/or sender. Further, the decryption component 408a can store the decrypted content in the content data store 406a. Additionally or optionally, the decryption component 408a can instruct an output interface (e.g., display screen, microphone, etc.) to present the received content to the user. In one aspect, the key 402a can be utilized for encryption/decryption (e.g., by the encryption component 414a/decryption component 408a) until the key 402a is determined to be valid (e.g., during a communication session, for a predefined time, and/or until a timer expires or a data session is terminated, until deleted by the user, etc.).

Additionally or optionally, prior to, or concurrent with, the transfer of content, a verification component 410a can be utilized to confirm and/or ensure that the respective key generation components of the UEs (102a-102f) have generated the same/identical/matching key. In one example, the verification component 410a can perform a key synchronization protocol between the UEs (102a-102f) by instructing the encryption component 404a to encrypt sample/test data by utilizing candidate keys that are generated by employing different subsets of a bit sequence/seed generated by the fusion component 304. Additionally or alternatively, the verification component 410a can instruct the UEs (102a-102f) to exchange data with checksum values encrypted using the candidate keys. In yet another example scenario, wherein UEs (102a-102f) generate public and private keys, the UEs (102a-102f) can facilitate key synchronization by comparing the respective public keys that have been generated by the UEs (102a-102f). For example, the UEs (102a-102f) can broadcast their public keys and if the public keys match it can be determined that same/identical/matching private keys have been generated. Once the verification component 410a selects a key from the candidate keys and/or confirms that the UEs (102a-102f) have generated the same/identical/matching key, the content transfer component 204a can initiate and perform a secure content transfer among the UEs (102a-102f) by employing the key.

Figure 5:
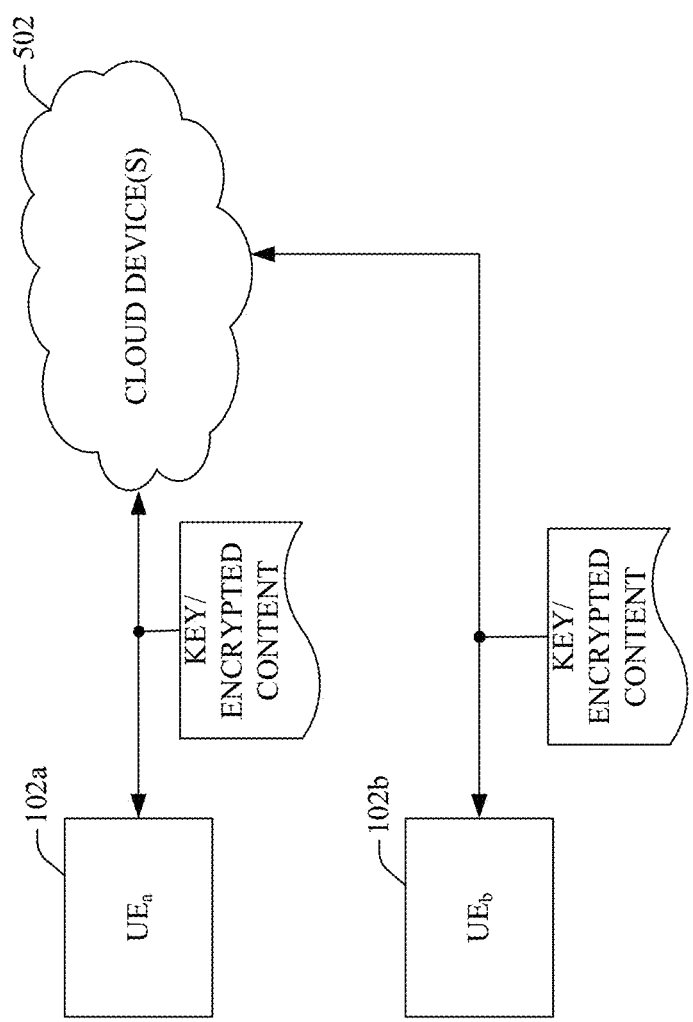
FIG. 5 illustrates an example system that facilitates secure access of data stored in a cloud device.

Referring now to FIG. 5, there illustrated is an example system 500 that facilitates secure access of data stored in a cloud device (e.g., device within a private network), according to one or more aspects of the disclosed subject matter. System 500 can facilitate content sharing between two or more UEs (e.g., UE 102a and UE 102b). UE 102a and UE 102b can be substantially similar and can include functionality as more fully described herein, for example, as described above with regard to systems 100-400.

In one aspect, UE 102a and UE 102b can sense and/or record (e.g., via sensor(s) 104a and 104b) common context data to facilitate pairing. As part of the pairing, the UE 102a and UE 102b can generate (e.g., via key generation components 106a and 106b) identical cryptographic keys based on the common context data. In one example scenario, UE 102a can securely share data with UE 102b, by encrypting the data using the key and transferring the data to a shared storage device, for example, a cloud device 502 (e.g., of a private or public network). Moreover, the UE 102a can transfer the encrypted data via most any communication network and/or utilizing most any communication protocol. Further, the UE 102b can access and/or receive the encrypted data from the cloud device 502 and utilize the key to decrypt the data. The decrypted data can be stored within the UE 102b and/or displayed on a screen of the UE 102b. In one aspect, the address and/or location (e.g., Universal resource location (URL)) of the cloud device 502 can be known to both UEs (102a, 102b), for example, predefined by a device manufacturer, service provider, etc., and/or determined/defined by the UEs (102a, 102b) during a synchronization session (e.g., during, as part of, and/or subsequent to the pairing). It can be appreciated that although the above example describes transferring data from UE 102a to UE 102*b*, the subject specification is not so limited and that UE 102*b* can also securely transfer data to UE 102*a* (and/or multiple paired devices) via the cloud device 502.

In another example scenario, the keys generated during UE pairing can be utilized to provide access to resources on the cloud device 502. For example, UE 102*a* can transfer the key to the cloud device 502 (e.g., cloud server) and instruct the cloud device 502 to share specific resources (e.g., content, processing resources, etc.) with paired devices (e.g., UE 102*b*). Additionally and/or optionally, the UE 102*a* can specify access parameters/restrictions (e.g., access time) associated with the access. Moreover, UE 102*b* can employ the key to access the authorized resources of cloud device 502. In one aspect, the cloud device can perform authentication (e.g., based on the key received from the UE 102*b*) prior to granting the access. As an example, the cloud device 502 can implement various access policies (e.g., predefined by UE 102*a*) to restrict type of access (e.g., read only, read and write, temporary access permanent access, etc.) by the UE 102*b*. It can be appreciated that although only two UEs are depicted, system 500 can facilitate sharing of content between multiple paired devices via a cloud device 502.

Figure 6:
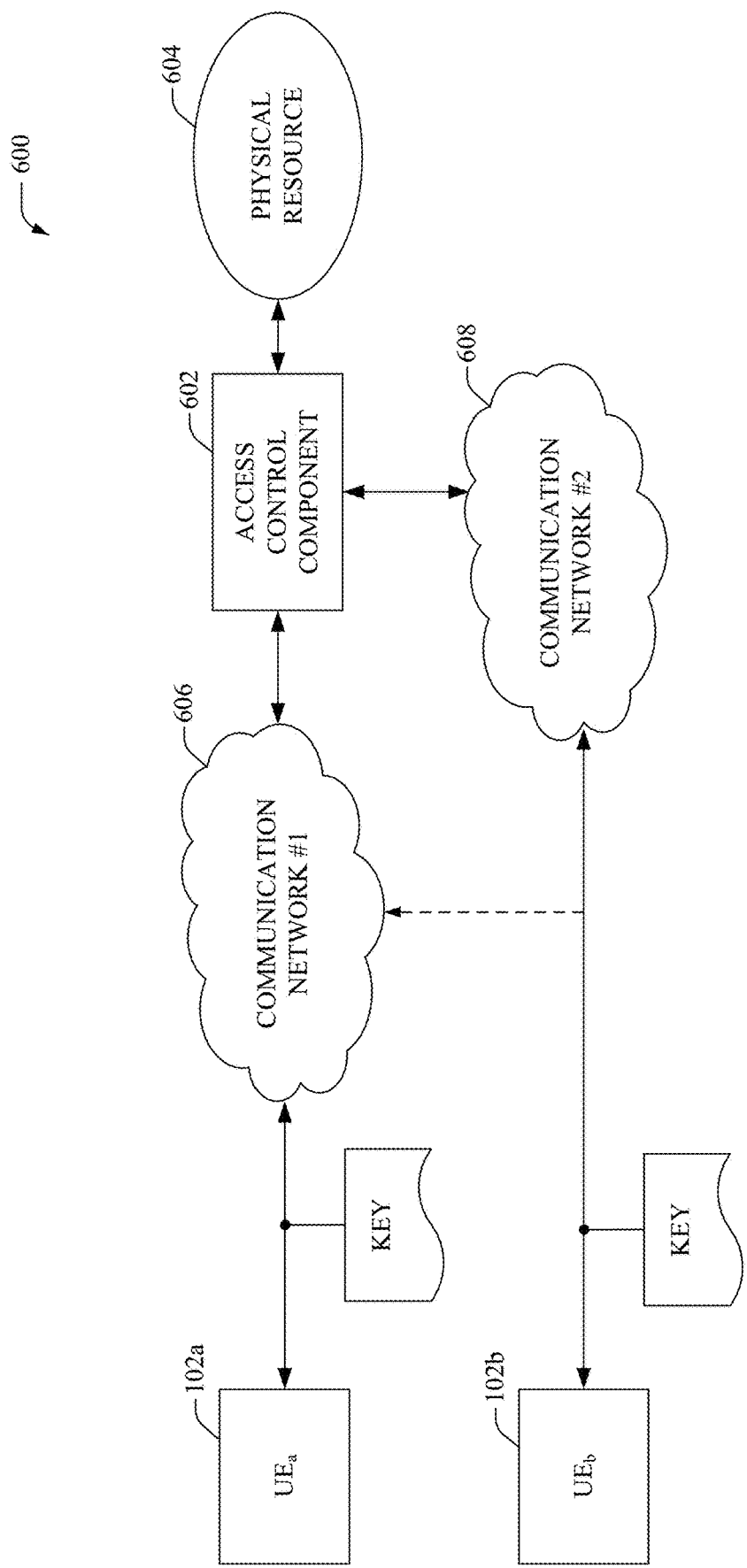
FIG. 6 illustrates an example system that facilitates authorizing access to a physical resource based on multi-device pairing.

Referring now to FIG. 6, there illustrated is an example system 600 that facilitates authorizing access to a physical resource based on multi-device pairing, in accordance with an aspect of the subject disclosure. To impede unauthorized access, system 600 facilitates utilization of keys, generated by two or more devices (e.g., UEs 102*a*, 102*b*) based on sensing common context data, to restrict access to a physical resource (e.g., a room, building, vault, etc.). It can be noted that UE 102*a* and UE 102*b* can be substantially similar and can include functionality as more fully described herein, for example, as described above with regard to systems 100-500.

According to an aspect, UE 102*a* and UE 102*b* can sense and/or record (e.g., via sensor(s) 104*a* and 104*b*) common context data to facilitate pairing. As part of the pairing, the UE 102*a* and UE 102*b* can generate (e.g., via key generation components 106*a* and 106*b*) identical cryptographic keys based on the common context data. In one aspect, UE 102*a* can authorize UE 102*b* to access a physical resource, such as, but not limited to, a house, a room, an area, a vehicle, a vault, etc. based on the cryptographic keys. As an example, the UE 102*a* can transfer the key to an access control component 602 that controls access to the physical resource (e.g., via an electronic lock). For example, the access control component 602 can be part of a home security system that restricts access to a house. Additionally or optionally, the UE 102*a* can also provide the access control component 602 with access parameters, including (but not limited to) timing data that specifies a time interval during which the UE 102*b* is authorized to access the physical resource. Moreover, the UE 102*a* can transfer the key via most any wired or wireless communication network 606 (e.g., a WiFi network, a cellular network, etc.). Further, the UE 102*b* can communicate with the access control component 602 to request for access to the physical resource. In one aspect, UE 102*b* can communicate with the access control component 602 via a different communication network 608 and/or the same communication network 606. Moreover, UE 102*b* can provide the access control component 602 with the key and the access control component 602 can perform authorization/authentication based on received key. Since the key provided by UE 102*b* matches the key provided by UE 102*a*, the access control component 602 can allow the UE 102*b* to access the physical resource 604 (e.g., unlock the electronic lock).

In an example scenario, two (or more) friends meeting at a coffee shop can employ system 600 to pair their respective UEs (e.g., UEs 102*a*, 102*b*) based on sensing common context data in their environment/surroundings. The UEs (e.g., UEs 102*a*, 102*b*) can generate identical keys that the first friend can transmit to his home security system (e.g., via UE 102*a*). In this example scenario, when the second friend arrives at the home, he can use his UE (e.g., UE 102*b*) to transmit the key to the home security system, which can employ the key to authorize the friend and open the house door. This eliminates the need (and mitigates a security risk) for a homeowner to type the key on the guests phone. In one aspect, the home security system can remove the key from its data store after the friend's visit is over (versus using a fixed key or physical key shared by all persons accessing the home). In another example, system 600 can also be employed to generate and share a key to a hotel room between one or more guests sharing the room. It can be appreciated that although only two UEs are depicted, system 600 can facilitate enabling multiple paired devices to access a physical resource 604.

Figure 7:
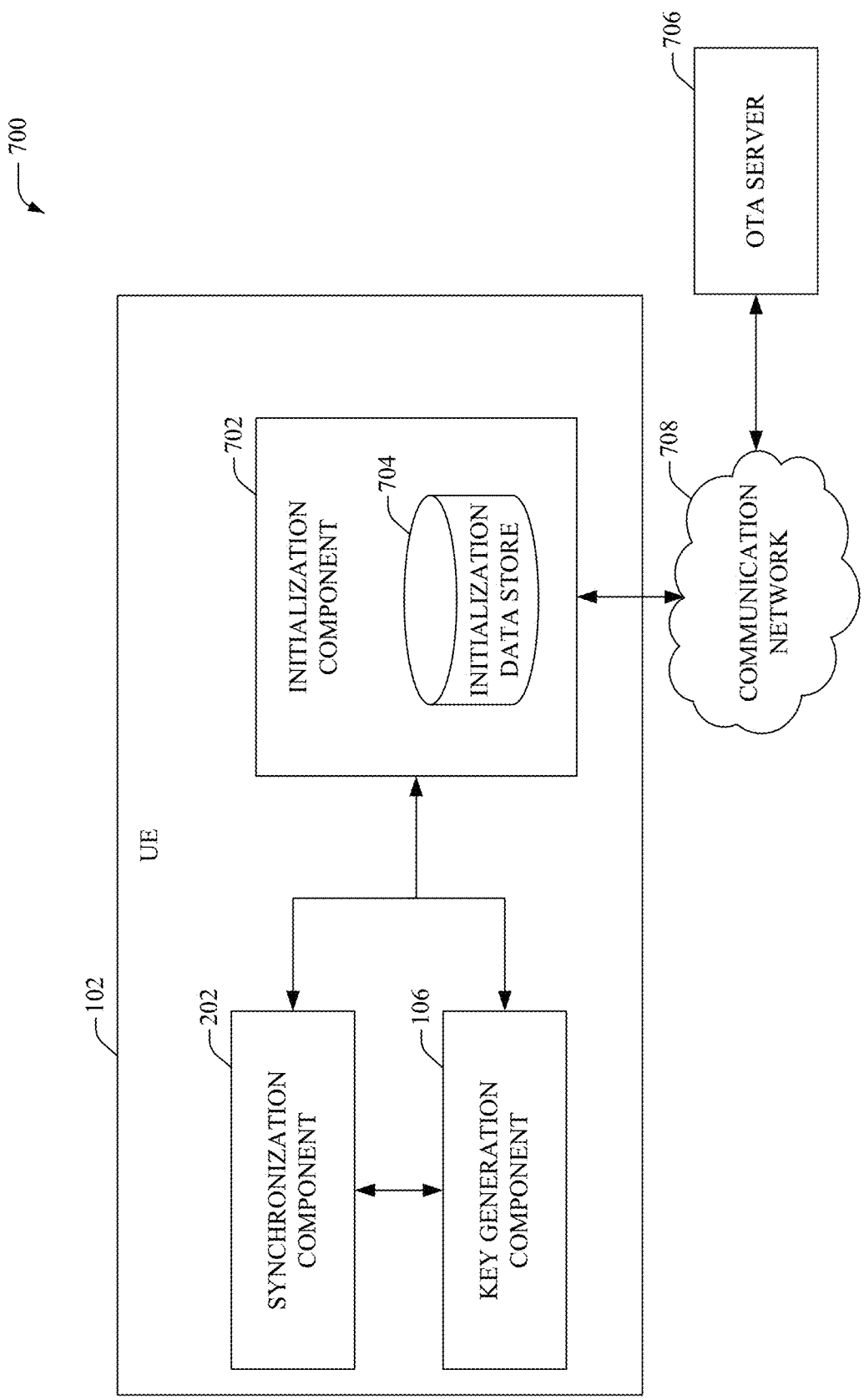
FIG. 7 illustrates an example system that initializes user equipment to facilitate group pairing based on common context data.

Referring now to FIG. 7, there illustrated is an example system 700 that initializes UEs to facilitate group pairing based on common context data, in one aspect of the subject disclosure. It is noted that the UE 102 can be substantially similar to UEs 102*a* and 102*b*, and can include functionality as more fully described herein, for example, as described above with regard to UEs 102*a* and 102*b*. Further, synchronization component 202 can be substantially similar to synchronization components 202*a* and 202*b*, and can include functionality as more fully described herein, for example, as described above with regard to synchronization components 202*a* and 202*b*. Furthermore, the key generation component 106 can be substantially similar to key generation component 106*a* and/or key generation component 106*b* and can include functionality as more fully described herein, for example, as described above with regard to the key generation components 106*a* and/or 106*b*.

In one embodiment, the UE 102 can comprise an initialization component 702 that can receive, and/or store within initialization data store 704, initialization data that can be utilized during pairing the UE 102 with one or more other UEs based on sensing common context data. In an aspect, the initialization data can be received (e.g., during power-on, during idle mode, periodically, on demand, in response to an event, etc.) from various entities. For example, the initialization data can be specified by a user via an input interface (e.g., keypad, touch screen, microphone, etc.) of the UE 102. In another example, the initialization data can be pre-programmed by a manufacturer during device manufacturing. In yet another example, the initialization data can be provided via over-the-air communications (e.g., transmitted by a network operator, service provider, etc.). In this example, the initialization component 702 can receive the initialization data from an OTA server 706 via most any communication network 708. In one aspect, the initialization data can be received via an out-of-bands communication. In still another example, the initialization data can be downloaded from an application (app) server (not shown) as part of an update to a device-pairing app installed on the UE 102.

According to an aspect, the initialization data can include, but is not limited to, user/manufacturer/service provider preferences and/or policies, and/or most any data that can be employed to facilitate pairing two or more devices. As an example, the initialization data can include data collection parameters utilized by the synchronization component 202, such as (but not limited to) a time period for which data is to be sensed, a sampling frequency, information defining which sensors are to be utilized to measure the signal data (e.g., use only video data, use audio and temperature data, etc.), a time at which the measurement is to be started/stopped, a predefined signal (e.g., pattern/sequence or knocks, a predefined image, a predefined audio tone, etc.) at which the measurement is to be started/stopped, etc. In another example, the initialization data can include parameters utilized by the key generation component 106, such as (but not limited to) an algorithm or modifications to the algorithm utilized to generate the key, a time period for which the key is to be valid, a policy for expiration of validity of the key, etc. Additionally or alternatively, initialization data can include an address of shared storage device (e.g., cloud device 502), access policies associated with accessing, transferring, and/or sharing content, data transfer preferences (e.g., which communication network to utilize), etc.

Figure 8:
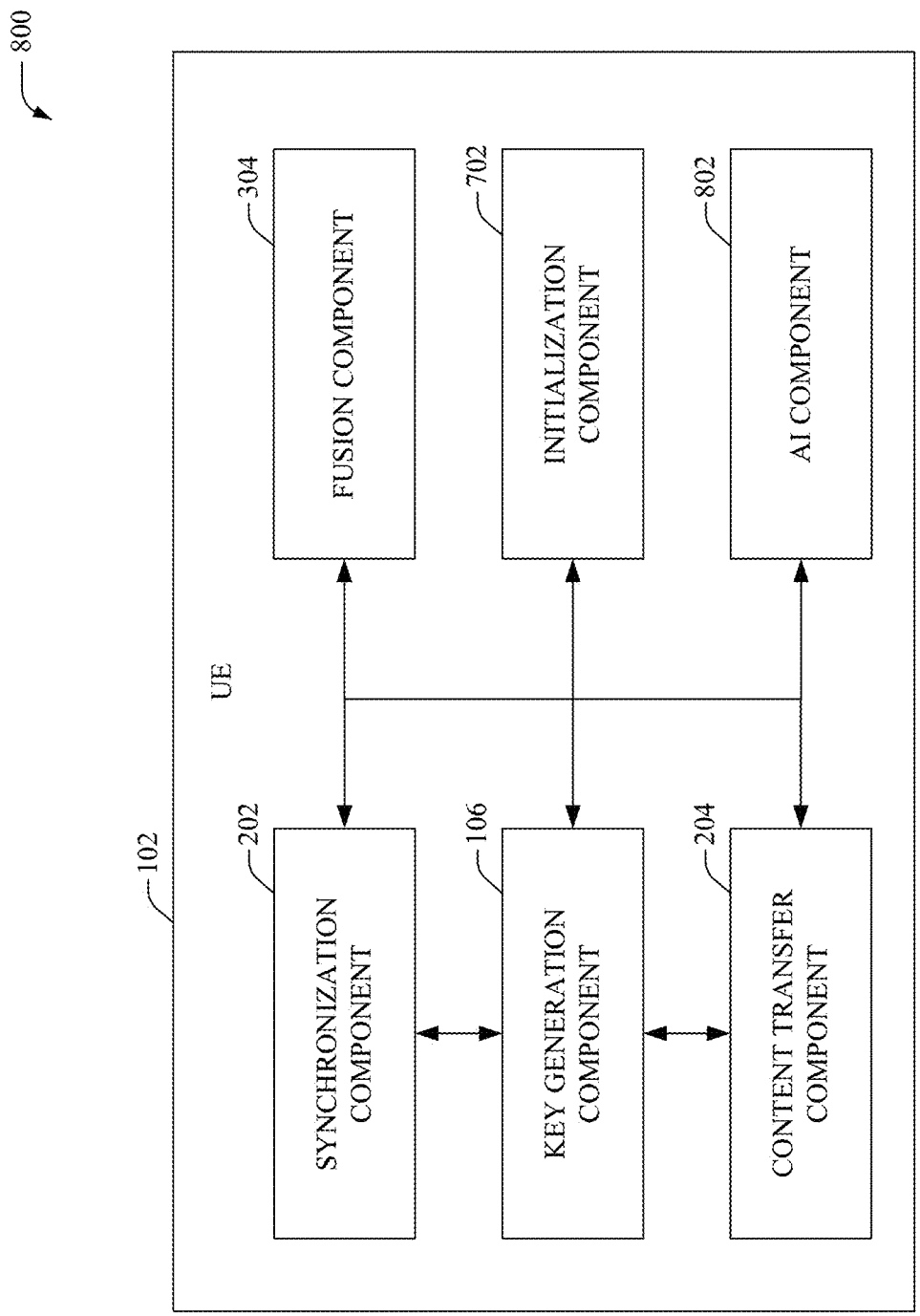
FIG. 8 illustrates an example system that facilitates automating one or more features in accordance with the subject embodiments.

Referring now to FIG. 8, there illustrated is an example system 800 that employs an artificial intelligence (AI) component 802, which facilitates automating one or more features in accordance with the subject embodiments. It can be appreciated that the key generation component 106, the synchronization component 202, the content transfer component 204, the fusion component 304, and the initialization component 702 can include respective functionality, as more fully described herein, for example, with regard to systems 100-700.

An example embodiment, system 800 (e.g., in connection with automatically determining data collection parameters, keys, and/or data transfer parameters) can employ various AI-based schemes for carrying out various aspects thereof. For example, a process for determining optimal data collection parameters, smoothing/filtering sensor input data, determining how to fuse data collected from the various sensors, determining which features of sensed data are to be utilized for sequence generation, determining content sharing, delivery, and/or access rights, etc., can be facilitated via an automatic classifier system and process. A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information received from UEs, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, user/operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria when to start pairing devices, which sensors to utilize, when to start/stop sensing, features of the sensed signals for generating a seed, how long to store a key in a data store, content that is to be transferred, etc. The criteria can include, but is not limited to, historical patterns, UE behavior, user preferences, service provider preferences and/or policies, location of the UE, current time, etc.

Figure 9:
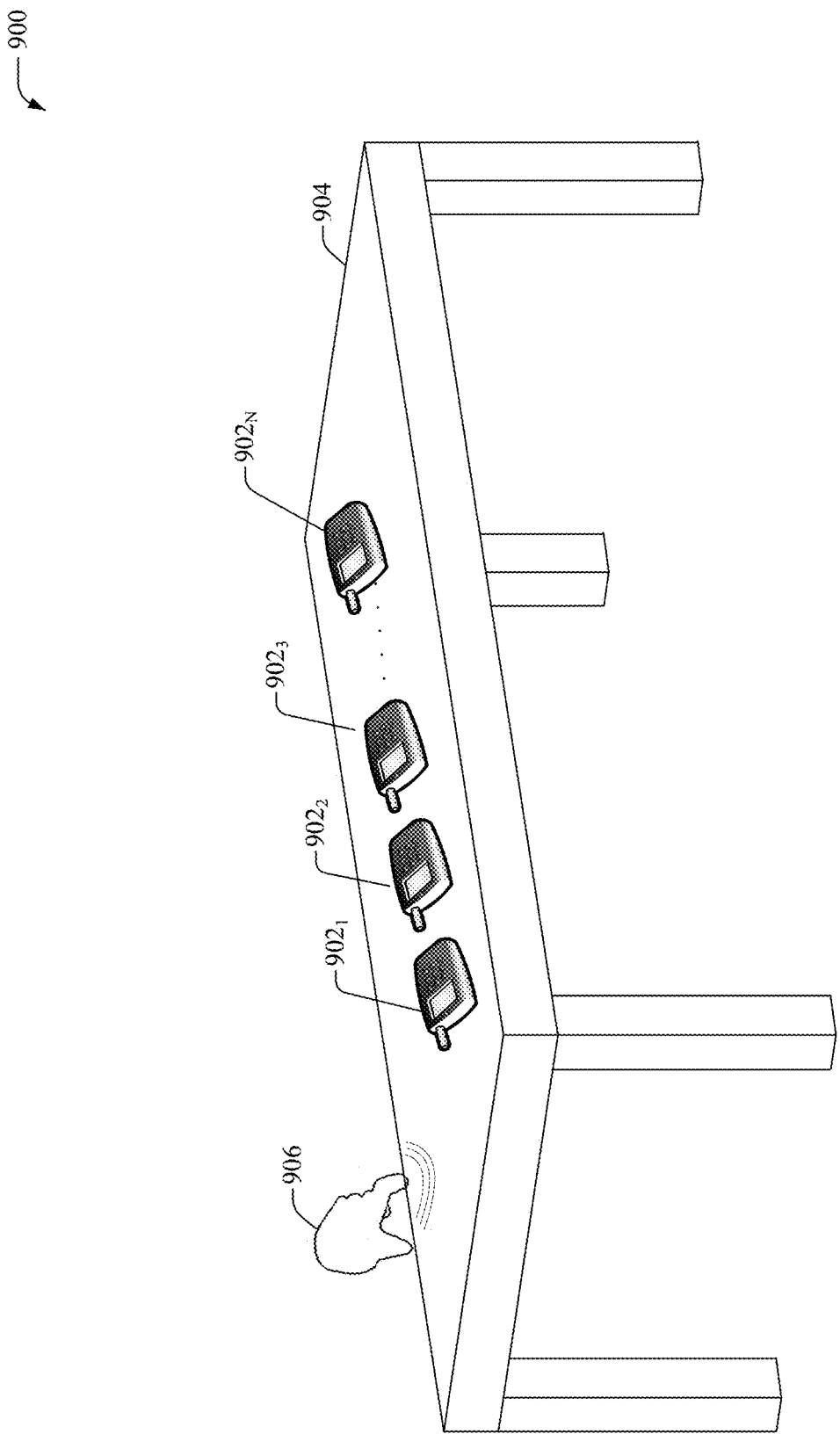
FIG. 9 illustrates a non-limiting example scenario that illustrates pairing multiple devices based on common context sensing.

Referring now to FIG. 9, there illustrated is a non-limiting example scenario 900 that illustrates pairing multiple devices based on common context sensing, in one aspect of the various embodiments. It is noted that the UEs $902_1$-$902_N$ (where N is most any positive integer greater than 1) can be substantially similar to UEs 102a and/or 102b, and can include functionality as more fully described herein, for example, as described above with regard to UEs 102a and 102b. Although, FIG. 9 depicts UEs $902_1$-$902_N$ to be mobile phones, it can be appreciated that UEs $902_1$-$902_N$ can be the same or different devices (e.g., wired and/or wireless), such as, but not limited to, laptops, tablets, personal computers, gaming modules, etc.

Consider an example scenario wherein the users of UEs $902_1$-$902_N$ would like to share content among the UEs $902_1$-$902_N$ in an ad-hoc manner. For example, people at a meeting can share documents (e.g., meeting agenda, presentation slides, business cards, etc.) and/or people at a party, a concert, or sporting event can share multimedia files (e.g., photos, videos, etc.). According to an aspect, systems 100-800 can be utilized to set up such sharing and/or content transfer. Moreover, systems 100-800 provide a faster, more efficient, and automated technique to share the content (e.g., reducing multiple manual instructions from the users, such as, forming a group, approving participants, entering passwords or pins, etc.). To initiate the pairing, the users can place their UEs $902_1$-$902_N$ close to each other (e.g., within a predefined distance such that the UEs can observe/sense the same (or almost the same) data), for example, on table 904. In one aspect, a random pattern of knocks can be applied to the table at 906. The UEs $902_1$-$902_N$ can sense (e.g., via respective accelerometers $302_1$ and/or gyroscopes $3022_1$) the sequence of knocks and/or the pauses between the knocks. In this example, even though the UEs $902_1$-$902_N$ can receive the sequence slightly at different times (e.g., based on unequal distance from the source), the UEs $902_1$-$902_N$ can still observe the same (or substantially similar) sequence with the same (or substantially similar) inter-knock delays. In addition, due to different sensor sensitivities (e.g., different sensor implementations, protective cases), the signal amplitude as seen by the different UEs $902_1$-$902_N$ can vary but the UEs can extract common features (e.g., patterns and/or sequence) from the signals to compensate for the variations in sensitivity. Machine learning analysis (e.g., by the respective AI components 802 of the UEs $902_1$-$902_N$) can be applied to the signal in the time and frequency domain to facilitate filtering and/or smoothing of the signal, and reduce noise. Additionally or alternatively, the UEs $902_1$-$902_N$ can also record signals via other sensors (e.g., sensors 104) and/or utilize timestamp data/and/or location data to improve the likelihood of generating identical keys that are difficult to replicate by unauthorized devices. For example, the UEs $902_1$-$902_N$ can capture photo snapshots with their cameras. Since they are all on the same table 904, they can capture the same details on photos taken at the same time (e.g., a ceiling lamp). In another example, the UEs $902_1$-$902_N$ can analyze a voice command captured at the same time by all the devices.

According to an aspect, the UEs $902_1$-$902_N$ utilize the common signal for generating a cryptographic key (e.g., by employing respective fusion components 304 and/or key generating components 106). To ensure that all the UEs $902_1$-$902_N$ are recording the same signal (e.g., vibration from knocks) at the same time (or substantially same time), the UEs $902_1$-$902_N$ can be synchronized to start and end sensing and/or recording the signal at the same time (or substantially same time). In one example, a predefined signal (e.g., a double knock on the table surface 904, a speech signal of a person saying "start," etc.) and/or a long enough "silence" (e.g., lack of signal) can be utilized to instruct the UEs $902_1$-$902_N$ to be ready to record when a subsequent signal (e.g., vibration) is received. According to an aspect, the UEs $902_1$-$902_N$ can indicate a readiness to receive signal by displaying certain data, such as, but not limited to, a symbol or a color on their screens (or a beep via their speakers). For example, the UEs $902_1$-$902_N$ can display a green color on their respective screens when they are ready to receive the signal. Additionally or optionally, a synchronization protocol can be executed by the UEs $902_1$-$902_N$, wherein a designated UE can broadcast a signal to start/stop sensing the context. In the above example, once all the UEs $902_1$-$902_N$ display a green color on their screens, the user can apply the random pattern of knocks to the table at 906.

In one aspect, the UEs $902_1$-$902_N$ can extract specific properties of the signal (e.g., sequence of knocks) to generate a seed (e.g., a sequence of bits) that can be employed (e.g., by the respective key generation components 106) to determine a session key or initialization key. Since the seed is based on the common sensing context, a device (not shown) in a different context will not be able to construct the same seed and thus, will be unable to obtain the same key. For example, a different device (not shown) that is not on the table surface 904 will not be able to sense the vibrations from the knocks and thus, will not be able to generate the same key. Accordingly, the different device will be prevented from decrypting the shared content.

In one aspect, the UEs $902_1$-$902_N$ can perform (e.g., by employ respective verification components 410a) a key synchronization protocol to verify that all the devices generated the same key. Once verified that all the UEs $902_1$-$902_N$ have generated identical keys, the UEs $902_1$-$902_N$ can securely share content and/or grant access to virtual (e.g., digital content) and/or physical (e.g., buildings) resources. For example, UE $902_1$ can encrypt content using the key and can broadcast (e.g., via a WiFi network, cellular network, ZigBee network, etc.) the encrypted content. Moreover, only the paired UEs $902_2$-$902_N$ will be able to decrypt the content. As an example, a different device (not shown) in the vicinity may be able to hear the broadcast messages but will not be able to decrypt the content since it cannot generate the same key. In an aspect, the UE 9021 can also store the encrypted content on a shared storage device (e.g., in the cloud) and only the paired UEs $902_2$-$902_N$ can retrieve and decrypt the content. As an example, the key can be utilized during the meeting (or other event) and/or for a duration after the meeting (e.g., to share minutes or the meeting, follow-up documents, photos or videos participants recorded during a sporting event or concert, etc.).

In one example, the key can be utilized to grant access to a physical resource such as a restricted area. If the user of UE $902_1$ requests to authorize the other users of UEs $902_2$-$902_N$ to access his home, the UE $902_1$ can securely transmit the key to the user's home system (e.g., a home security system that controls a lock on the house door) and/or instruct the home system to allow the other users (that provide the same key) to enter the house. Accordingly, when the other users arrive at the house, they can communicate with the home system and utilize the keys to facilitate authentication to unlock the door. This eliminates the need (mitigates the risk involved) for the homeowner to type the key on all the other UEs $902_2$-$902_N$, which can be a tedious task as the number of other UEs increases. The key can be deleted from the home system, for example, via UE $902_1$, via an interface (e.g., graphical user interface) on the home system, and/or via most any authorized device.

FIGS. 10-12B illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 10:
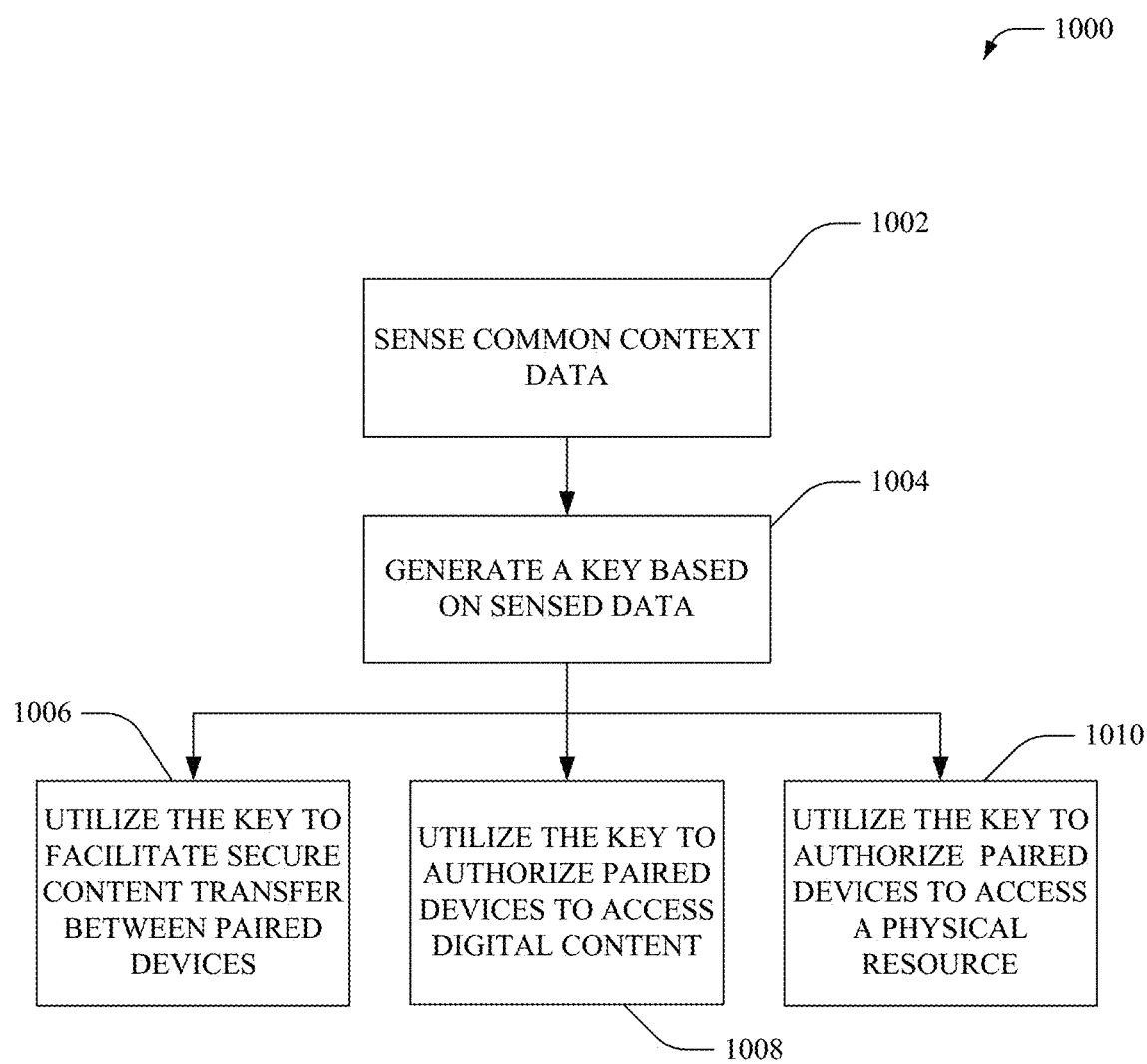
FIG. 10 illustrates an example method that facilitates pairing a set of devices based on common context data.

Referring now to FIG. 10, illustrated is an example method 1000 that facilitates pairing of a set of devices based on common context data, according to an aspect of the subject disclosure. As an example, method 1000 can be implemented by two or more communication devices to deter, impede and/or prevent access of data or physical resources by unauthorized entities (non-paired devices). For large groups of communication devices (e.g., three or more communication devices), sequential one-to-one pairing of devices within the group can be a long and tedious process. In contrast, method 1000 provides a fast and efficient approach to facilitate simultaneous (or substantially simultaneous) group pairing (e.g., one-to-many or many-to-many pairing) for the multiple communication devices.

At 1002, common context data can be sensed. Typically, the common context data can be most any data that can be observed by a group of communication devices that are close to each other (e.g., within a specified distance from each other) and that cannot be accurately observed by other devices that are further away (e.g., beyond the specified distance). As an example, the common context data can comprise a continuous signal (e.g., motion signals, audio signals, video signals, etc.) that can change over time and that is typically not easy to replicate at a later time. In another example, the common context data can comprise static data (e.g., that does not change over time), such as, but not limited to photos. The sensors that capture the common context data can include, but are not limited to, an accelerometer, a gyroscope, a camera, a microphone, a light sensor, a humidity sensor, a temperature sensor, a location sensor, and the like.

At 1004, a key can be generated based on the sensed data. For example, common context data collected by one or more sensors can be fused and several features/properties can be extracted from the common context data. Moreover, the features/properties can be employed to generate a seed (e.g., a sequence of bits), which in turn can be utilized to generate the key. In one aspect, at 1006, the key can be utilized to facilitate secure content transfer between the two or more communication devices. Since the same key is generated by the two or more communication devices, the key can be utilized to encrypt/decrypt the content that is transferred. In another aspect, at 1008, the key can be utilized to authorize the two or more communication devices to access digital content, for example, stored in a network device (e.g., cloud server). In yet another aspect, the key can be utilized to authorize the two or more communication devices to access a physical resource, for example, a room, a house, a locker, etc. As an example, a first authorized device of the two or more communication devices can transmit the key to a control system that manages access to the digital content and/or physical resource, such that the control system can authorize the paired communication devices to access the digital content and/or physical resource in response to receiving the key from the paired devices.

Figure 11:
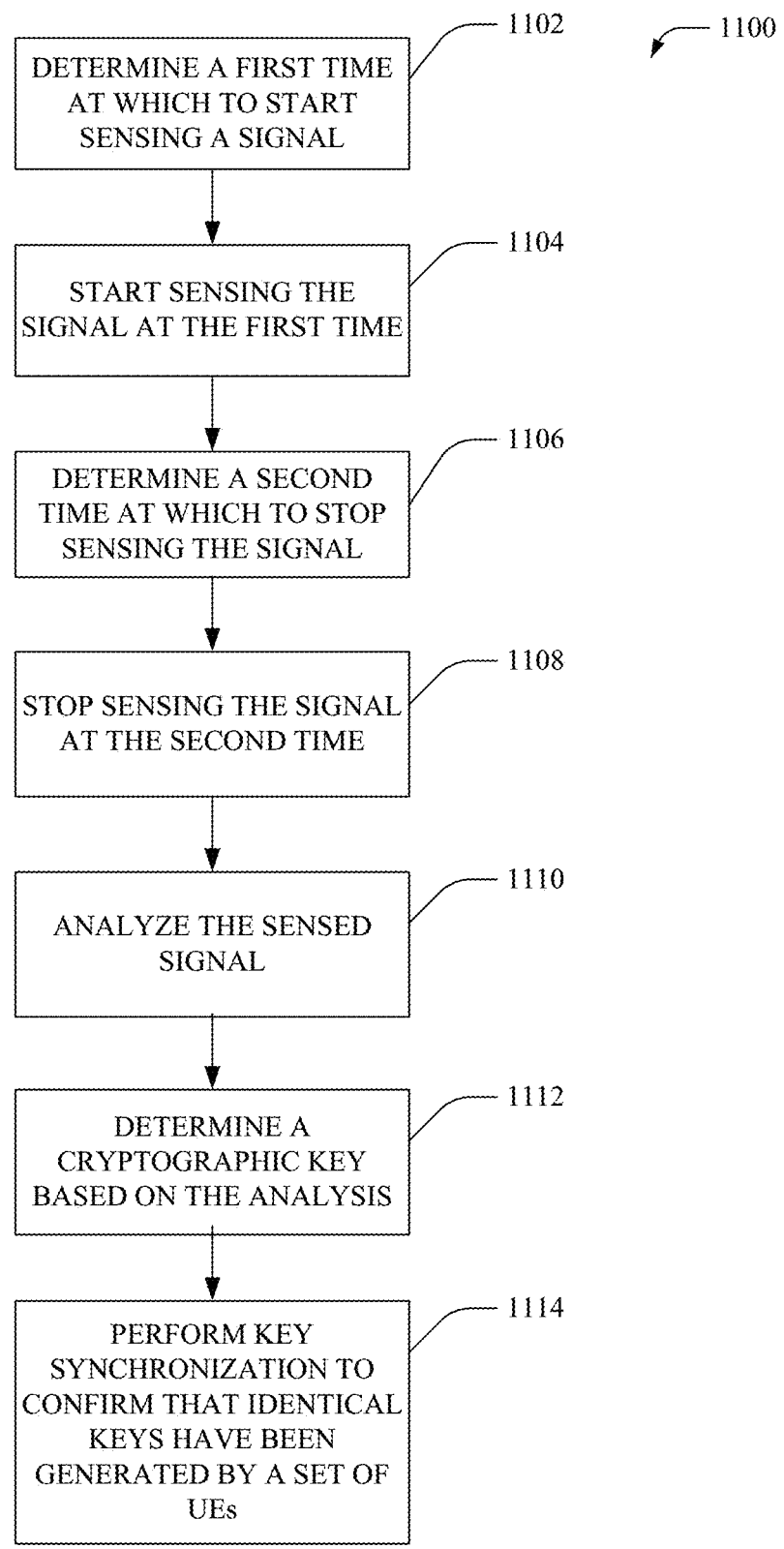
FIG. 11 illustrates an example method that facilitates generation of a cryptographic key for pairing a group of communication devices.

FIG. 11 illustrates an example method 1100 that facilitates generation of a cryptographic key for pairing a group of communication devices, according to an aspect of the subject disclosure. As an example, method 1100 can be implemented by two or more communication devices to facilitate group-wise pairing. Typically, sensors of the two or more communication devices can monitor and/or record a continuous signal for a defined time period. At 1102, a first time at which to start sensing a signal can be determined. In one aspect, the start time can be dynamically determined by the devices, determined based on initialization data received (e.g., from a user, service provider, device manufacturer, etc.) prior to the pairing, and/or determined based on synchronization data received (e.g., from one or more of the devices) prior to, or during, the pairing. At 1104, signal sensing can be initiated at the first time. At 1106, a second time at which to stop sensing the signal can be determined. In one aspect, the stop time can be dynamically determined by the devices, determined based on initialization data received (e.g., from a user, service provider, device manufacturer, etc.) prior to the pairing, and/or determined based on synchronization data received (e.g., from one or more of the devices) prior to, or during, the pairing. At 1108, signal sensing can be stopped at the second time.

At 1110, the sensed signal can be analyzed. For example, signals sensed by multiple sensors can be aggregated to determine a seed. At 1112, a cryptographic key can be determined based on the analysis. For example, properties/features (e.g., size information, an aspect ratio, number of colors used, pixel color distribution across the image, and properties determined based on Eigenvalue-based features, SIFT descriptors, Harris descriptors, MOPS descriptors extracted from the sensed signals, etc.). Moreover, the key can be utilized to encrypt/decrypt content to facilitate secure transmissions. Additionally or alternatively, the key can be utilized as credentials to access virtual and/or physical resources. Further, at 1114, key synchronization can be performed to verify that all the paired devices have generated identical keys. For example, test data and checksum values can be encrypted by utilizing candidate keys that are generated by employing different subsets of a bit sequence generated based on the sensed signal and transmitted to the paired devices. If all the devices can accurately decrypt the test data based on a specific candidate key, the specific candidate key can be selected for encryption/decryption of subsequent content transfer.

Figure 12A:
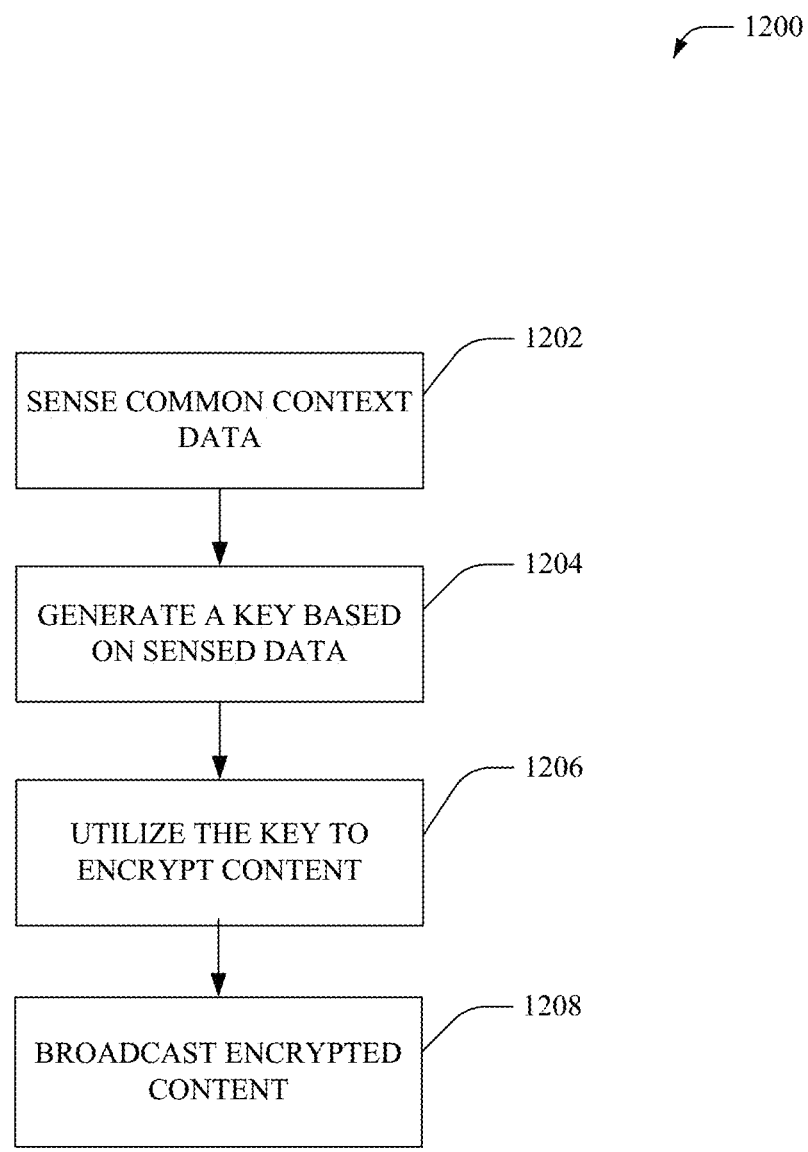
FIGS. 12A-12B illustrate example methods that facilitate secure content transfer between multiple devices.
Figure 12B:
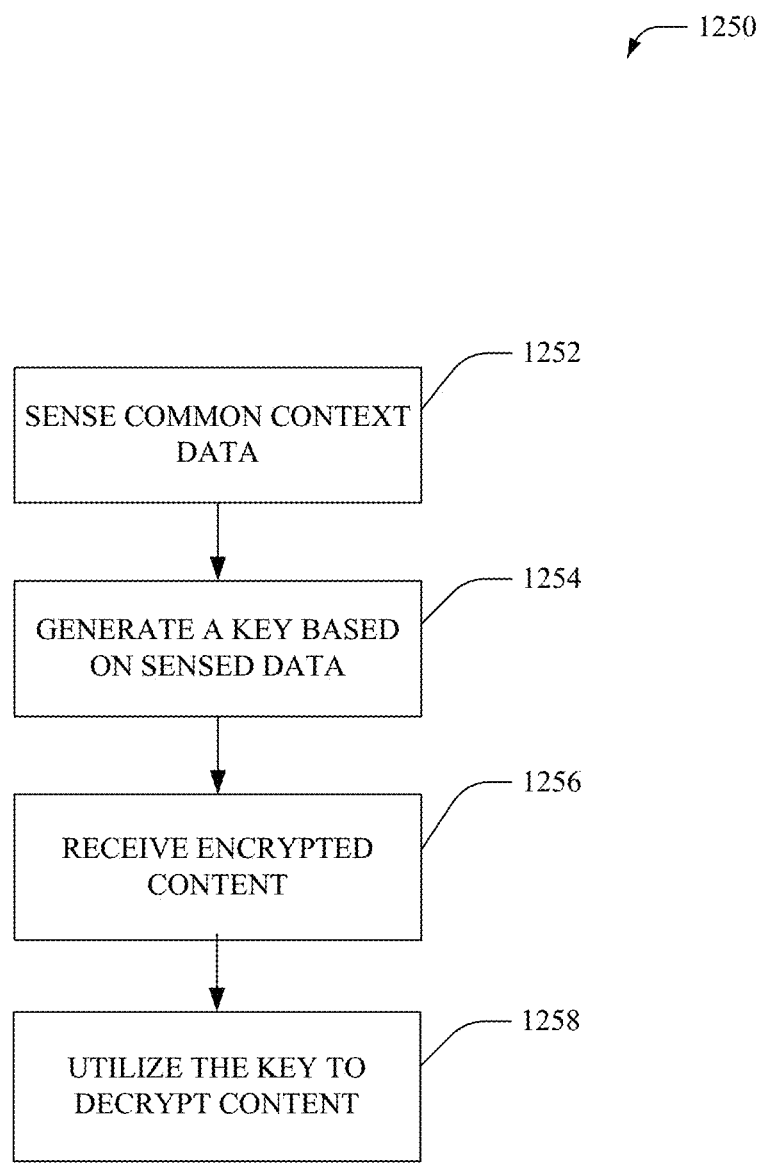

Referring now to FIGS. 12A-12B, there illustrated are example methods (1200, 1250) that facilitate secure content transfer between two (or more) devices, according to an aspect of the subject disclosure. In one aspect, method 1200 can be implemented by a first device that transmits the content, while method 1250 can be implemented by a second device that receives the content. At 1202, common context data can be sensed. Typically, the common context data can be most any data that can be observed by a group of communication devices that are close to each other (e.g., within a specified distance from each other) and that cannot be accurately observed by other devices that are further away (e.g., beyond the specified distance). As an example, the common context data can comprise, but is not limited to, motion signals, audio signals, video signals, humidity/temperature data, image data, etc. At 1204, a key can be generated based on the sensed data. For example, one or more features/properties can be extracted from the common context data collected by one or more sensors to determine a set of sequences that can be aggregated and/or fused to generate a seed (e.g., a sequence of bits), which in turn can be utilized to generate the key.

At 1206, the key can be utilized to encrypt content, for example, by employing most any encryption algorithm (e.g., hash functions, RSA algorithm, AES, etc.). Further, at 1208, the encrypted content can be broadcasted, for example, via a public (or private) communication network (e.g., a wireless or wired local area network (LAN), a WiFi network, a cellular network, a Zigbee network, etc.).

Referring now to FIG. 12B, method 1250 can be employed by the second device to receive the decrypted content. In one aspect, at 1252, common context data can be sensed. As an example, the second device can sense the common context data at the same time as (or substantially the same time as) the first device (at 1202). Further, at 1254, a key can be generated based on the sensed data. At 1256, the encrypted content can be received, for example, via the public (or private) communication network. At 1258, the key can be utilized to decrypt the encrypted content. As an example, the decrypted content can be stored within the second device and/or rendered on an output interface of the second device.

Figure 13:
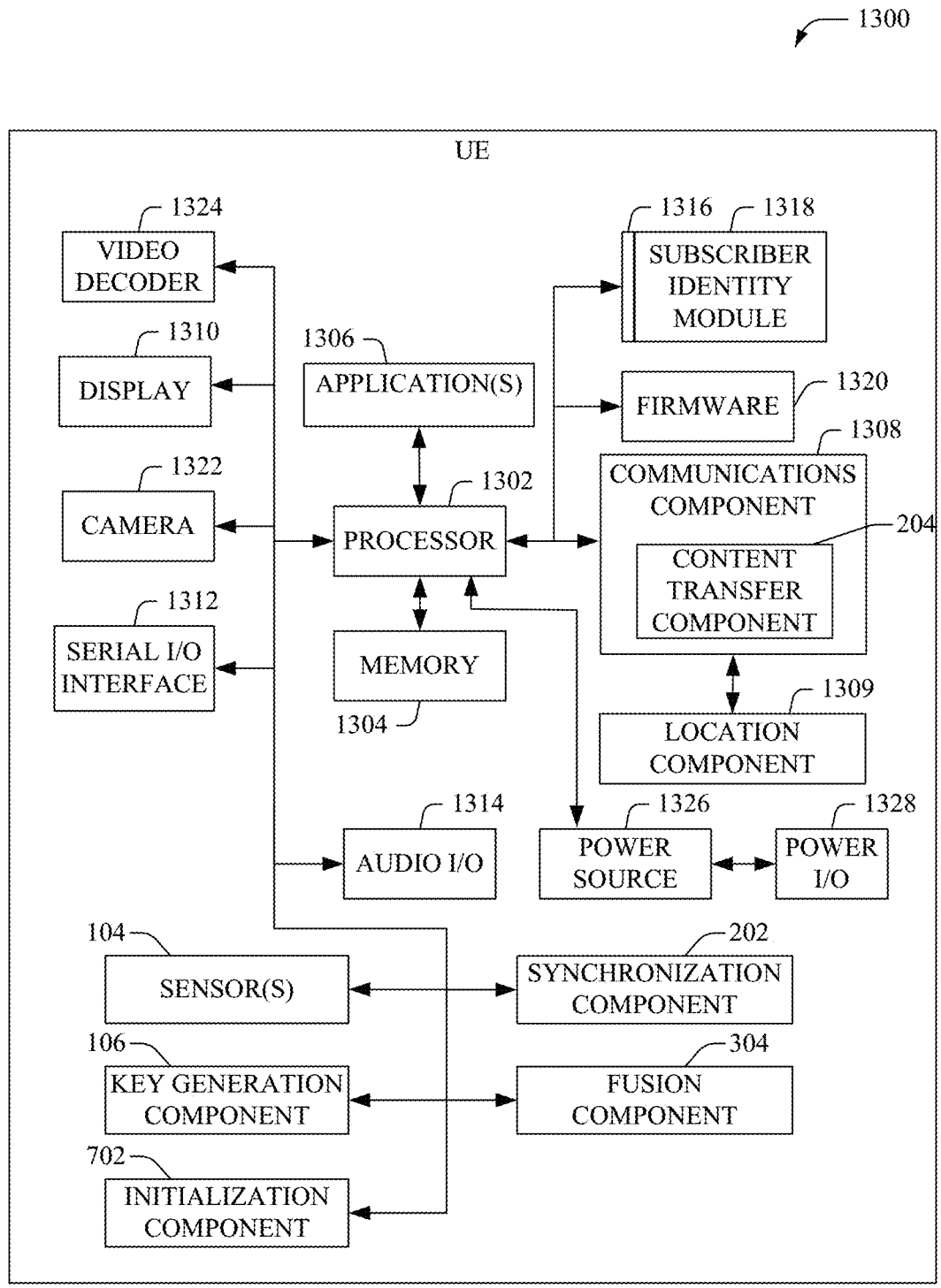
FIG. 13 illustrates an example block diagram of a user equipment suitable for multi-device pairing based on common context sensing.

Referring now to FIG. 13, there is illustrated a block diagram of a UE 1300 that can be paired with one or more other UEs based on commonly sensed data in accordance with the subject specification. In addition, the UE 1300 can be substantially similar to and include functionality associated with UEs 102*a*-102*f* described herein. In one aspect, the UE 1300 can include a processor 1302 for controlling all onboard operations and processes. A memory 1304 can interface to the processor 1302 for storage of data (e.g., including keys, content, and/or initialization data) and one or more applications 1306 being executed by the processor 1302. A communications component 1308 can interface to the processor 1302 to facilitate wired/wireless communication with external systems (e.g., communication network 412, cloud devices 502, communication network #1 (606), communication network #2 (608), and/or communication network 708, etc.). The communications component 1308 interfaces to a location component 1309 (e.g., GPS transceiver) that can facilitate location detection of the UE 1300.

The UE 1300 can include a display 1310 for displaying received content (and/or content to be transferred) and/or for displaying text information related to operating and using the device features. A serial I/O interface 1312 is provided in communication with the processor 1302 to facilitate serial communication (e.g., USB, and/or IEEE 1394) via a hard-wire connection. Audio capabilities are provided with an audio I/O component 1314, which can include a speaker for the output of audio signals related to, for example, recorded data or telephony voice data, and a microphone for inputting voice signals for recording and/or telephone conversations.

Further, the UE 1300 can include a slot interface 1316 for accommodating a subscriber identity module (SIM) 1318. Firmware 1320 is also provided to store and provide to the processor 1302 startup and operational data. The UE 1300 can also include an image capture component 1322 such as a camera and/or a video decoder 1324 for decoding encoded multimedia content. Further, the UE 1300 can include a power source 1326 in the form of batteries, which power source 1326 interfaces to an external power system or charging equipment via a power I/O component 1328. In addition, the UE 1300 can include sensors 104, key generation component 106, synchronization component 202, content transfer component 204, fusion component 304, and initialization component 702, which can be stored in memory 1304 and/or implemented by an application 1306, can include respective functionality, as more fully described herein, for example, with regard to systems 100-800.

Figure 14:
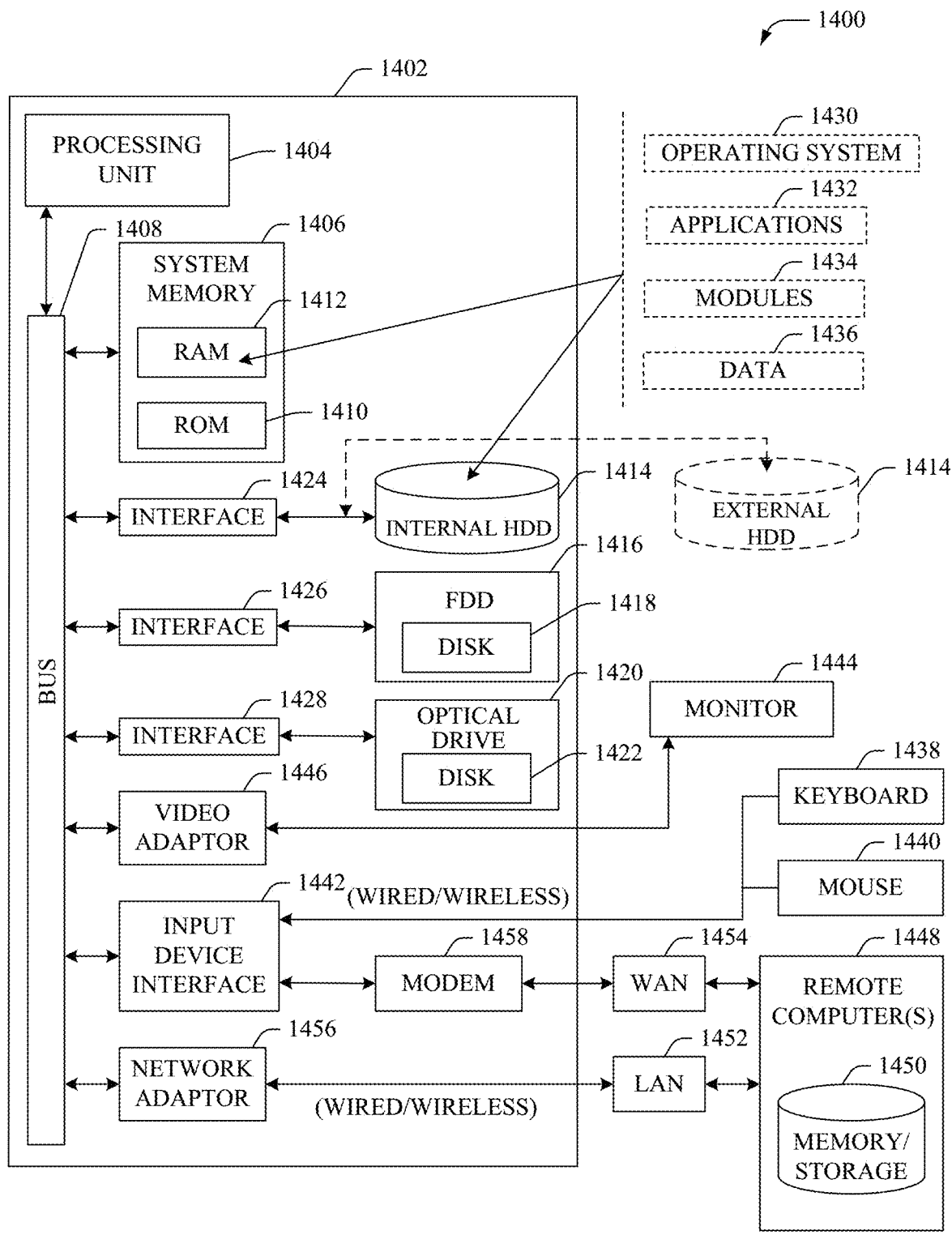
FIG. 14 illustrates a block diagram of a computer operable to execute the disclosed communication architecture.

Referring now to FIG. 14, there is illustrated a block diagram of a computer 1402 operable to execute the disclosed communication architecture. In order to provide additional context for various aspects of the disclosed subject matter, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. As an example, the component(s), server(s), equipment, and/or device(s) (e.g., key generation component 106, synchronization component 202, content transfer component 204, fusion component 304, initialization component 702, AI component 802, UEs 102*a*-102*f*, cloud devices 502, access control component 602, OTA server 706, etc.) disclosed herein with respect to system 100-800 can each include at least a portion of the computer 1402. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414, which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and/or a pointing device, such as a mouse 1440 or a touchscreen or touchpad (not illustrated, but which may be integrated into UE 102 in some embodiments). These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc. A monitor 1444 or other type of display device is also connected to the system bus 1408 via an interface, such as a video adapter 1446.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
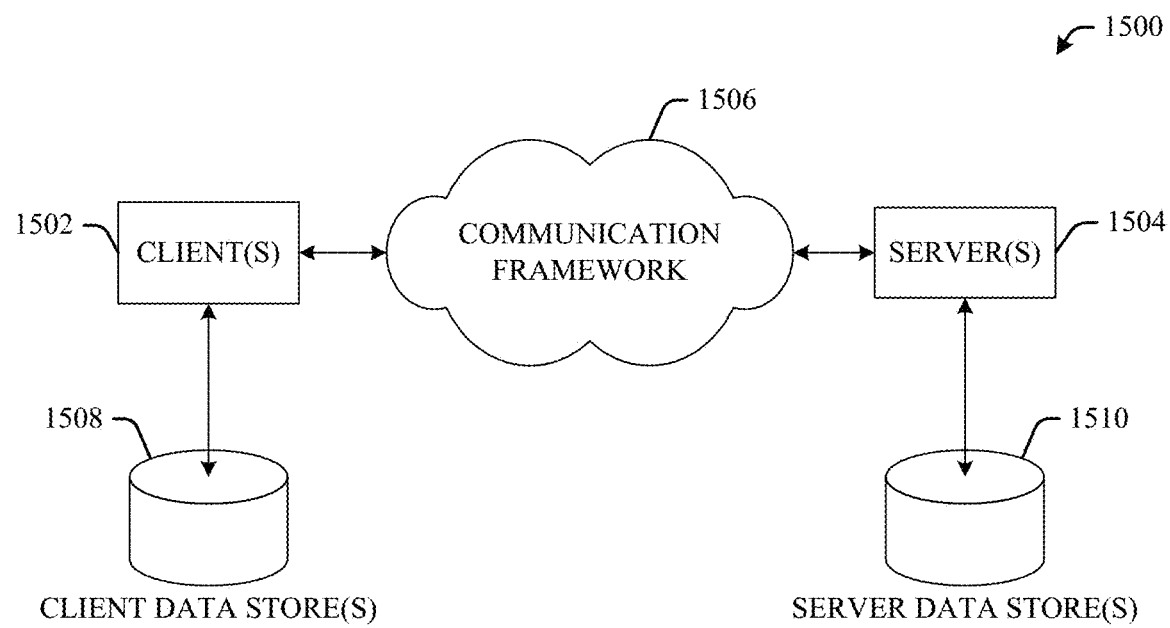
FIG. 15 illustrates a schematic block diagram of an exemplary computing environment in accordance with the various embodiments.

Referring now to FIG. 15, there is illustrated a schematic block diagram of a computing environment 1500 in accordance with the subject specification. The system 1500 includes one or more client(s) 1502. The client(s) 1502 can be hardware and/or software (e.g., threads, processes, computing devices).

The system 1500 also includes one or more server(s) 1504. The server(s) 1504 can also be hardware and/or software (e.g., threads, processes, computing devices). The servers 1504 can house threads to perform transformations by employing the specification, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A first device, comprising:
   a processor; and
   a memory that stores executable instructions that, when executed by the processor, facilitate performance of operations, comprising:
      determining first cryptographic key data based on first context data associated with an environment of the first device;
      encrypting test data using the first cryptographic key data, resulting in encrypted test data;
      sending the encrypted test data to a second device; and
      receiving a confirmation from the second device that the first cryptographic key data is valid based on the encrypted test data being able to be decrypted by the second device using second cryptographic key data determined by the second device based on second context data associated with the environment.

2. The first device of claim 1, wherein the confirmation that the first cryptographic key data is valid indicates the first cryptographic key data corresponds to the second cryptographic key data.

3. The first device of claim 1, wherein the operations further comprise:
   based on the receiving the confirmation, sending the first cryptographic key data to a third device; and
   granting, to the third device, authority to perform secure data communication with the second device using the first cryptographic key data.

4. The first device of claim 1, wherein the operations further comprise:
   based on the receiving the confirmation, encrypting content data for transmission to the second device using the first cryptographic key data.

5. The first device of claim 4, wherein the operations further comprise:
   subsequent to the encrypting the content data, facilitating a transfer of the content data to the second device, wherein the content data is capable of being decrypted by the second device using the second cryptographic key data.

6. The first device of claim 1, wherein the operations further comprise:
   based on the receiving the confirmation, employing the first cryptographic key data to decrypt content data received from the second device encrypted using the second cryptographic key data.

7. The first device of claim 1, wherein the operations further comprise:
   capturing context signals from the environment using a sensor; and
   determining the first context data based on the context signals, wherein the second context data is determined by the second device based on a group of the context signals.

8. The first device of claim 7, wherein the group of the context signals is concurrently captured by the first device and the second device.

9. The first device of claim 7, wherein the group of the context signals are selected from a group of signals comprising: a vibration signal applied by an external force to a surface shared by the first device and the second device, a sound signal occurring in the environment, an image signal occurring in the environment, a temperature signal occurring in the environment, and a light signal occurring in the environment.

10. The first device of claim 7, wherein the determining the first cryptographic key comprises:
    selecting features from the context signals based on a common sensing modality supported by the first device and the second device; and
    generating the first cryptographic key based on the features.

11. The first device of claim 7, wherein the capturing comprises:
initiating the capturing of the context signals in response to detecting a synchronization signal; and
stopping the capturing in response to passage of a defined period of time.

12. A method, comprising:
determining, by a first device comprising a processor, first cryptographic key data based on first context data associated with an environment of the first device;
encrypting, by the first device, test data using the first cryptographic key data, resulting in encrypted test data;
sending, by the first device, the encrypted test data to a second device; and
receiving, by the first device, a confirmation from the second device that the first cryptographic key data is valid based on the encrypted test data being able to be decrypted by the second device using second cryptographic key data determined by the second device based on second context data associated with the environment.

13. The method of claim 12, wherein the confirmation that the first cryptographic key data is valid indicates the first cryptographic key data corresponds to the second cryptographic key data.

14. The method of claim 12, further comprising:
based on the receiving the confirmation sending, by the first device, the first cryptographic key data to a third device; and
granting, by the first device to the third device, authority to perform secure data communication with the second device using the first cryptographic key data.

15. The method of claim 12, further comprising:
based on the receiving the confirmation, encrypting, by the first device content data for transmission to the second device using the first cryptographic key data.

16. The method of claim 15, further comprising:
subsequent to the content data encrypting, facilitating, by the first device, a transfer of the content data to the second device, wherein the content data is capable of being decrypted by the second device using the second cryptographic key data.

17. The method of claim 12, further comprising:
based on the receiving the confirmation, employing, by the first device, the first cryptographic key data to decrypt content data received from the second device encrypted using the second cryptographic key data.

18. The method of claim 12, further comprising:
capturing, by the first device, context signals from the environment using a sensor; and
determining, by the first device, the first context data based on the context signals, wherein the second context data is determined by the second device based on a group of the context signals.

19. A machine-readable storage medium, comprising executable instructions that, when executed by a processor of a first device, facilitate performance of operations, comprising:
determining first key data based on context signals captured from an environment of the first device;
encrypting test data using the first key data, resulting in encrypted test data;
sending the encrypted test data to a second device; and
receiving a confirmation from the second device that the first key data is valid based on the encrypted test data being determined to have been able to be decrypted by the second device using second key data determinable by the second device based on second context signal captured by the second device from the environment.

20. The machine-readable storage medium of claim 19, wherein the operations further comprise:
based on the receiving the confirmation, encrypting, by the first device, content data for transmission to the second device using the first key data.

* * * * *